United States Patent
Kaji et al.

[11] Patent Number: 5,813,018
[45] Date of Patent: Sep. 22, 1998

[54] AUTOMATED TEXT EXTRACTION FROM SOURCE DRAWING AND COMPOSITION INTO TARGET DRAWING WITH TRANSLATED TEXT PLACEMENT ACCORDING TO SOURCE IMAGE ANALYSIS

[75] Inventors: Hiroyuki Kaji, Tama; Hiroyuki Nakagawa, Kawasaki, both of Japan

[73] Assignees: Hitachi Microcomputer System Ltd.; Hitachi, Ltd., both of Tokyo, Japan

[21] Appl. No.: 405,926

[22] Filed: Mar. 16, 1995

Related U.S. Application Data

[63] Continuation of Ser. No. 982,772, Nov. 27, 1992, abandoned.

[30] Foreign Application Priority Data

Nov. 27, 1991 [JP] Japan .................................. 3-312222

[51] Int. Cl.⁶ .............................................. G06T 11/60
[52] U.S. Cl. ............................................................ 707/502
[58] Field of Search ................................... 395/144–151, 395/769, 768, 783, 793, 803; 364/419.14; 382/291, 292, 176

[56] References Cited

U.S. PATENT DOCUMENTS

| | | | |
|---|---|---|---|
| 4,204,193 | 5/1980 | Schroeder | 382/292 |
| 4,513,442 | 4/1985 | Scherl | 382/176 |
| 4,685,060 | 8/1987 | Yamano et al. | 395/754 |
| 4,856,074 | 8/1989 | Nagaoka | 382/180 |
| 4,933,984 | 6/1990 | Nakano et al. | 382/175 |
| 4,949,287 | 8/1990 | Yamaguchi et al. | 395/782 |
| 4,974,194 | 11/1990 | Barker et al. | 395/803 |
| 5,005,127 | 4/1991 | Kugimiya et al. | 395/755 |
| 5,031,121 | 7/1991 | Iwai et al. | 395/777 |
| 5,050,222 | 9/1991 | Lee | 382/176 |
| 5,075,851 | 12/1991 | Kugimiya et al. | 395/756 |
| 5,091,964 | 2/1992 | Shimomura | 382/174 |
| 5,167,016 | 11/1992 | Bagley et al. | 395/793 |
| 5,181,261 | 1/1993 | Nagao | 382/266 |
| 5,201,011 | 4/1993 | Bloomberg et al. | 382/175 |
| 5,220,623 | 6/1993 | Yagasaki et al. | 382/292 |
| 5,233,685 | 8/1993 | Landes et al. | 395/805 |
| 5,268,999 | 12/1993 | Yokoyama | 395/141 |
| 5,278,918 | 1/1994 | Bernzott et al. | 382/176 |
| 5,307,265 | 4/1994 | Winans | 395/758 |
| 5,307,422 | 4/1994 | Wang | 382/177 |
| 5,313,394 | 5/1994 | Clapp | 395/793 |
| 5,321,801 | 6/1994 | Ando | 395/797 |
| 5,339,412 | 8/1994 | Fueki | 395/615 |
| 5,351,189 | 9/1994 | Doi et al. | 395/753 |
| 5,428,727 | 6/1995 | Kurosu et al. | 395/763 |
| 5,455,901 | 10/1995 | Friend et al. | 395/768 |

OTHER PUBLICATIONS

*Systems and Computers in Japan*, "High–speed Transformation of Drawing Images Based on Structure Description", Y. Ariki, et al., vol. 18, No. 11, 1987.

*IEEE 1985 Compint—Computer Aided Technologies*, "Computer Generated Images and Drawings for Industrial Applications", T. Sakai, Montreal, Quebec, Canada (Convention & Exhibition Centre), Sep. 9–13, 1985.

Acerson, Word Perfect Series 5 Edition, The Complete Reference, 1988 pp. 417–443, 539, 1000–1013.

Banet, Digital Image Archiving, The Seybold Report on Desktop Publishing, May 7, 1990, Reprinted from Computer Select Jan. 1992.

*Primary Examiner*—Anton Fetting
*Attorney, Agent, or Firm*—Antonelli, Terry, Stout, & Kraus, LLP

[57] ABSTRACT

A document processing method and system for automizing extraction of source language sentences from figures, which is the pre-processing for figure translation, as well as embedding of translated sentences in drawings, which is the postprocessing in figure translation. The pre-processing consists of recognizing the regions included in a source figure, extracting a sentence from each region, and extracting the topological characteristics of the figure, and the post-processing consists of enlarging shrinking each sentence display region according to the change of the sentence length by translation, and generating a figure which preserves the extracted topological characteristics and includes the enlarged/shrinked sentence display regions.

19 Claims, 39 Drawing Sheets

FIG. 3(a)
FIGURE DATA
| LINE SEGMENT NUMBER | START POINT | END POINT |
|---|---|---|
| 1 | ( 2 , 3 ) | ( 6 , 3 ) |
| 2 | ( 9 , 3 ) | (14 , 3 ) |
| 3 | ( 6 , 5 ) | ( 9 , 5 ) |
| 4 | ( 2 , 7 ) | ( 6 , 7 ) |
| 5 | ( 9 , 7 ) | (14 , 7 ) |
| 6 | ( 2 , 3 ) | ( 2 , 7 ) |
| 7 | ( 6 , 3 ) | ( 6 , 7 ) |
| 8 | ( 9 , 3 ) | ( 9 , 7 ) |
| 9 | (14 , 3 ) | (14 , 7 ) |
FIG. 3(b)
TEXT DATA
LINE-FORMAT DATA
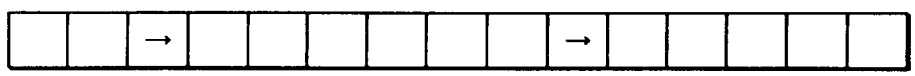
TEXT DATA
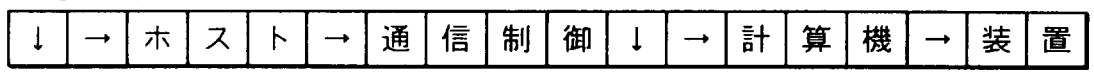
FIG. 3(c)
DISPLAY IMAGE

FIGURE DATA

| LINE SEGMENT NUMBER | START POINT | END POINT |
|---|---|---|
| 1 | ( 1 , 1 ) | (10 , 1 ) |
| 2 | (13 , 1 ) | (27 , 1 ) |
| 3 | (10 , 3 ) | (13 , 3 ) |
| 4 | ( 1 , 5 ) | (10 , 5 ) |
| 5 | (13 , 5 ) | (27 , 5 ) |
| 6 | ( 1 , 1 ) | ( 1 , 5 ) |
| 7 | (10 , 1 ) | (10 , 5 ) |
| 8 | (13 , 1 ) | (13 , 5 ) |
| 9 | (27 , 1 ) | (27 , 5 ) |

TEXT DATA

| ↓ | H | O | S | T |   |   |   |   |   | C | O | M | M | U | N | I | C | A | T | I | O |

| N | ↓ |   | C | O | M | P | U | T | E | R |   |   |   | C | O | N | T | R | O | L | L | E | R | ↓ |

DISPLAY IMAGE

FIG. 9(a)

| | | | | | | | | | | | | | | |
|---|---|---|---|---|---|---|---|---|---|---|---|---|---|---|
| | | | | | | | | | | | | | | |
| | 0 | 1 | 1 | 1 | 0 | | | 0 | 2 | 2 | 2 | 2 | 0 | |
| | 6 | | | | 7 | | | 8 | | | | | 9 | |
| | 6 | | | | 0 | 3 | 3 | 0 | | | | | 9 | |
| | 6 | | | | 7 | | | 8 | | | | | 9 | |
| | 0 | 4 | 4 | 4 | 0 | | | 0 | 5 | 5 | 5 | 5 | 0 | |
| | | | | | | | | | | | | | | |
| | | | | | | | | | | | | | | |

FIG. 9(b)

| 10 | 10 | 10 | 10 | 10 | 10 | 10 | 10 | 10 | 10 | 10 | 10 | 10 | 10 | 10 |
|---|---|---|---|---|---|---|---|---|---|---|---|---|---|---|
| 10 | 10 | 10 | 10 | 10 | 10 | 10 | 10 | 10 | 10 | 10 | 10 | 10 | 10 | 10 |
| 10 | 0 | 1 | 1 | 1 | 0 | 10 | 10 | 0 | 2 | 2 | 2 | 2 | 0 | 10 |
| 10 | 6 | 11 | 11 | 11 | 7 | 10 | 10 | 8 | 12 | 12 | 12 | 12 | 9 | 10 |
| 10 | 6 | 11 | 11 | 11 | 0 | 3 | 3 | 0 | 12 | 12 | 12 | 12 | 9 | 10 |
| 10 | 6 | 11 | 11 | 11 | 7 | 10 | 10 | 8 | 12 | 12 | 12 | 12 | 9 | 10 |
| 10 | 0 | 4 | 4 | 4 | 0 | 10 | 10 | 0 | 5 | 5 | 5 | 5 | 0 | 10 |
| 10 | 10 | 10 | 10 | 10 | 10 | 10 | 10 | 10 | 10 | 10 | 10 | 10 | 10 | 10 |
| 10 | 10 | 10 | 10 | 10 | 10 | 10 | 10 | 10 | 10 | 10 | 10 | 10 | 10 | 10 |

FIG. 12(a)

| 3 | 3 | 3 | 10 | 10 | 10 | 10 | 10 | 10 | 10 | 11 | 12 | 13 | 14 | 15 |
|---|---|---|----|----|----|----|----|----|----|----|----|----|----|----|

FIG. 12(b)

(grid showing: ホスト 通信制御 / 計算機 装置)

FIG. 12(c)

| SENTENCE NUMBER | SOURCE LANGUAGE SENTENCE |
|---|---|
| 10 |  |
| 11 | ホスト計算機 |
| 12 | 通信制御装置 |

FIG. 12(d)

| SENTENCE NUMBER | COORDINATES OF THE UPPER LEFT CORNER POINT | COORDINATES OF THE LOWER RIGHT CORNER POINT | INDEX TO COORDINATES ARRAY |
|---|---|---|---|
| 10 |  |  |  |
| 11 | (2, 3) | (6, 7) |  |
| 12 | (9, 3) | (14, 7) |  |

FIG. 14

| j | C(j) | D(j) |
|---|------|------|
| 1 | 2 | 3 |
| 2 | 6 | 3 |
| 3 | 9 | 3 |
| 4 | 14 | 3 |
| 5 | 6 | 5 |
| 6 | 9 | 5 |
| 7 | 2 | 7 |
| 8 | 6 | 7 |
| 9 | 9 | 7 |
| 10 | 14 | 7 |
| 11 | 2 | 3 |
| 12 | 2 | 7 |
| 13 | 6 | 3 |
| 14 | 6 | 7 |
| 15 | 9 | 3 |
| 16 | 9 | 7 |
| 17 | 14 | 3 |
| 18 | 14 | 7 |
| 19 | 2 | 3 |
| 20 | 6 | 3 |

| j | C(j) | D(j) |
|---|------|------|
| 21 | 6 | 3 |
| 22 | 6 | 7 |
| 23 | 2 | 7 |
| 24 | 6 | 7 |
| 25 | 2 | 3 |
| 26 | 2 | 7 |
| 27 | 9 | 3 |
| 28 | 14 | 3 |
| 29 | 14 | 3 |
| 30 | 14 | 7 |
| 31 | 9 | 7 |
| 32 | 14 | 7 |
| 33 | 9 | 3 |
| 34 | 9 | 7 |

$$Y(1) = Y(2)$$
$$X(2) - X(1) \geq 4$$
$$X(11) = X(12)$$
$$Y(12) - Y(11) \geq 2$$

FIG. 20(c)

$$X(2) - X(11) \geq 4$$
$$X(3) - X(11) \geq 7$$
$$Y(4) - X(11) \geq 12$$

| SENTENCE NUMBER | TARGET LANGUAGE SENTENCE |
|---|---|
| 10 | |
| 11 | HOST COMPUTER |
| 12 | COMMUNICATION CONTROLLER |

FIG. 22(b)

| SENTENCE NUMBER | LENGTH IN THE x DIRECTION | LENGTH IN THE y DIRECTION |
|---|---|---|
| 10 | | |
| 11 | 8 | 3 |
| 12 | 13 | 3 |

FIG. 22(c)

| SENTENCE NUMBER | TARGET LANGUAGE SENTENCE WITH CARRIAGE RETURN CODES |
|---|---|
| 10 | |
| 11 | HOST↓COMPUTER↓ |
| 12 | COMMUNICATION↓CONTROLLER↓ |

FIG. 22(d)

| H | O | S | T | | | | |
|---|---|---|---|---|---|---|---|
| | | | | | | | |
| C | O | M | P | U | T | E | R |

FIG. 22(e)

| C | O | M | M | U | N | I | C | A | T | I | O | N |
|---|---|---|---|---|---|---|---|---|---|---|---|---|
| | | | | | | | | | | | | |
| C | O | N | T | R | O | L | L | E | R | | | |

FIG. 29

| j | X(j) | Y(j) |
|---|------|------|
| 1 | 1 | 1 |
| 2 | 10 | 1 |
| 3 | 13 | 1 |
| 4 | 27 | 1 |
| 5 | 10 | 3 |
| 6 | 13 | 3 |
| 7 | 1 | 5 |
| 8 | 10 | 5 |
| 9 | 13 | 5 |
| 10 | 27 | 5 |
| 11 | 1 | 1 |
| 12 | 1 | 5 |
| 13 | 10 | 1 |
| 14 | 10 | 5 |
| 15 | 13 | 1 |
| 16 | 13 | 5 |
| 17 | 27 | 1 |
| 18 | 27 | 5 |
| 19 | 1 | 1 |
| 20 | 10 | 1 |

| j | X(j) | Y(j) |
|---|------|------|
| 21 | 10 | 1 |
| 22 | 10 | 5 |
| 23 | 1 | 5 |
| 24 | 10 | 5 |
| 25 | 1 | 1 |
| 26 | 1 | 5 |
| 27 | 13 | 1 |
| 28 | 27 | 1 |
| 29 | 27 | 1 |
| 30 | 27 | 5 |
| 31 | 13 | 5 |
| 32 | 27 | 5 |
| 33 | 13 | 1 |
| 34 | 13 | 5 |

FIG. 32(a)
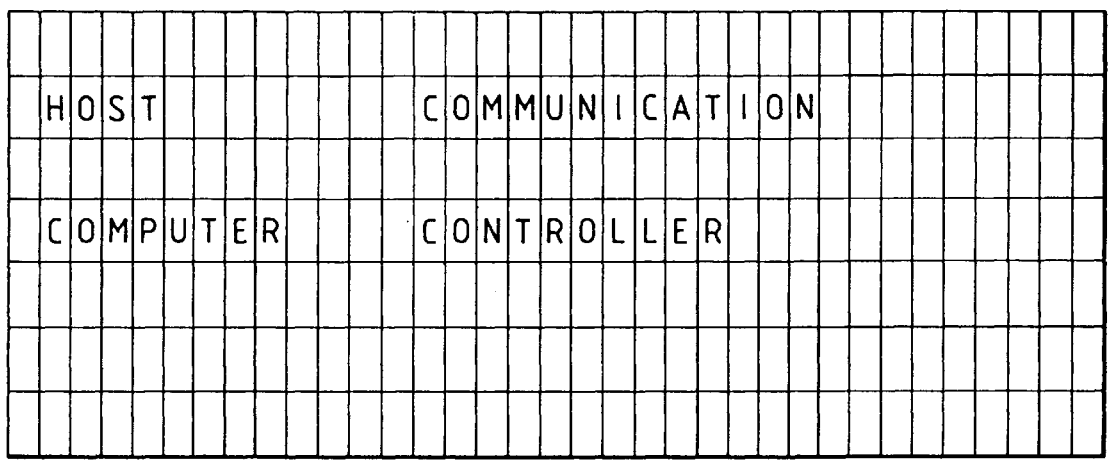
FIG. 32(b)
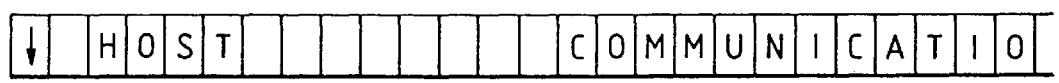
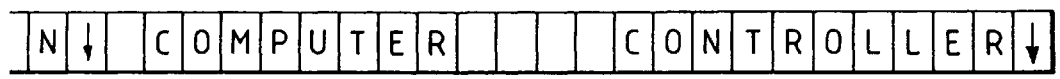

| LINE SEGMENT NUMBER | START POINT | END POINT |
|---|---|---|
| 1 | ( 1 , 1 ) | ( 6 , 1 ) |
| 2 | ( 9 , 1 ) | (14 , 1 ) |
| 3 | ( 6 , 3 ) | ( 9 , 3 ) |
| 4 | ( 1 , 5 ) | ( 6 , 5 ) |
| 5 | ( 9 , 5 ) | (14 , 5 ) |
| 6 | ( 1 , 1 ) | ( 1 , 5 ) |
| 7 | ( 6 , 1 ) | ( 6 , 5 ) |
| 8 | ( 9 , 1 ) | ( 9 , 5 ) |
| 9 | (15 , 1 ) | (15 , 5 ) |

| REGION NUMBER | SENTENCE |
|---|---|
| 11 | ホスト計算機 |
| 12 | ワークステーション |

| LINE SEGMENT NUMBER | START POINT | END POINT |
|---|---|---|
| 1 | (1, 1) | (5, 1) |
| 2 | (8, 1) | (14, 1) |
| 3 | (5, 3) | (8, 3) |
| 4 | (1, 5) | (5, 5) |
| 5 | (8, 5) | (14, 5) |
| 6 | (1, 1) | (1, 5) |
| 7 | (5, 1) | (5, 5) |
| 8 | (8, 1) | (8, 5) |
| 9 | (14, 1) | (14, 5) |

| | ホ | ス | ト | | | | ワ | ー | ク | ス | テ | ↓ | | 計 | 算 | 機 | |

| | | | | ー | シ | ョ | ン | |

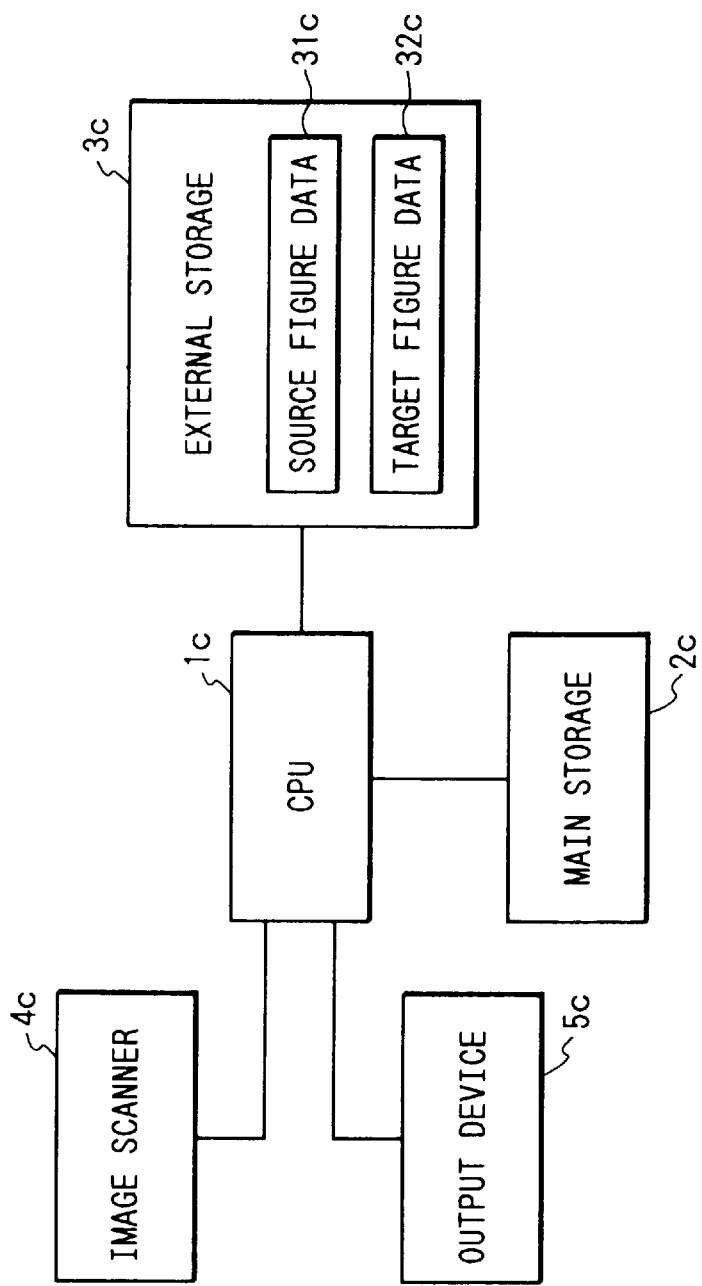

AUTOMATED TEXT EXTRACTION FROM SOURCE DRAWING AND COMPOSITION INTO TARGET DRAWING WITH TRANSLATED TEXT PLACEMENT ACCORDING TO SOURCE IMAGE ANALYSIS

The present application is a continuation application of U.S. Ser. No. 07/982,772, which was filed on Nov. 27, 1992, and is now abandoned.

BACKGROUND OF THE INVENTION

1. Field of the Invention

This invention is related to a document processing method and corresponding system, especially to the method and the system used to translate, create, and modify figures comprising drawings and texts.

2. Description of the Prior Arts

The conventional machine translation systems have handled text data comprising only characters. When any of those systems is used to translate a document: such as a manual containing figures comprising both drawing and text data, it always requires pre-processing to extract the text from the document data and post-processing to combine the translated text with drawing data. The pre-processing and post-processing must be executed while the operator operates the word processor, thereby increasing the cost of operation for conventional translation system for documents containing tables, flow charts, block diagrams, etc.

A machine translation system with pre-processing and post-processing capability is introduced in Japanese Patent No.219175/1990. The system separates character string data from drawing data, translates the character string data, and then combines the translated data with the drawing data.

In the technology of any of those conventional machine translation systems mentioned above, however, no techniques are shown in relation to dividing the character string data in a figure into sentences, each of which is a unit of translation. In general, it is not assured that all the characters comprising a sentence always lie continuously in a character string extracted mechanically. They cannot be entered to any machine translation systems as they are. Furthermore, when translated character string data are to be combined with a drawing, the size of the drawing, and even the shape in some cases, must be adjusted according to the change of the character string length caused by the translation. This is not mentioned at all in the conventional technology. According to the method described in Japanese Patent No. 219175/1990, a text often overflows the region of the drawing or an unnecessary space is generated within the region as a result of translation.

The same problem also occurs when a figure comprising a drawing and texts is created using a word processor. To enter drawing data fitted for the text data, it is necessary to calculate the length of each text to be embedded in the drawing and determine the coordinates of each line segment comprising the drawing before the entry. This is very troublesome and takes much time. When drawing data entry is made without such preparation, the entered line segment data must often be canceled and re-entered. This problem also occurs when the texts in an existing figure must be modified. The operator will often have to re-enter a substantial amount of line segment data just like he/she creates another new figure.

To solve those problems mentioned above, a word processor with block editing function has been developed; it enables the user to define a block (rectangle) enclosed in a ruled-line frame, and enter/edit texts block by block. There is also a more sophisticated word processor; it can add/delete rows and columns to/from the block when the length of a text exceeds the block size or when an unnecessary space is generated within the block. These editing processings, however, must be executed by the user based on his/her judgement. The functions cannot be executed automatically. Moreover, when some rows/columns are added/deleted to/from the block, other surrounding blocks located on the right and left/above and below the block are also affected. Therefore, the user cannot modify flow charts and other figures as he/she expects, even though no problem occurs when tables are modified.

As an application of character and drawing recognition technologies a handwritten figure input system has also been considered. Also in this system, the problems mentioned above have arisen. For handwritten figures, the character size and pitch cannot be strictly regulated. Characters are apt to vary in size and pitch when they are entered. On the other hand, when the recognized characters are to be printed out, the size and pitch are normalized. Therefore, a text often overflows the region of the drawing or an unnecessary space is generated within the region unless the drawing data are adjusted.

SUMMARY OF THE INVENTION

The purpose of this invention is to supply a method and a system for automatically executing the pre-processing and post-processing necessary for translating figures.

Another purpose of this invention is to supply a method and a system to allow the user to enter drawing data regardless of the lengths of the texts in the figure. In other words, it is to supply a method and a system for adjusting a drawing automatically according to the lengths of the texts to be embedded in the drawing.

Another purpose of this invention is to supply a method and a system for adjusting a drawing automatically according to the user's modification of the texts embedded in the drawing.

One more purpose of this invention is to allow drawing data to be automatically adjusted in the system and to provide a method to read handwritten figures and convert them into printed image figures.

Describing these technical subjects specifically in line with a figure translation system, it is possible to summarize them in the following two points.

One of the subjects is realizing a function to recognize sentences, or noun phrases in some cases, in the text data included in a figure. In text data in a figure, all the characters comprising a sentence do not always lie continuously. They may be separated into fragments by control codes or fragments of the other sentences. In such a case, the text data must be reorganized into a set of sentence data, each of which is a unit of translation.

Another subject is realizing a function to adjust drawing data so as to place translated sentences in the regions created by the drawing. Usually, a translated sentence is longer or shorter than the source sentence. Therefore, it is necessary to enlarge or reduce the region created by the drawing at a proper enlargement rate so that the translated sentence may fit in the region. At this time, the topology of the drawing cannot be changed, and the visual impressions of the figure should be kept as close as the source figure.

When creating a figure, it is required that a sentence be placed in each region of the drawing which is entered regardless of the length of the sentence. Therefore, it is indispensable to solve the latter subject mentioned above.

When a sentence in a figure is to be modified, it is possible to make the sentence before modification and the sentence after modification correspond to the source sentence and the translated sentence respectively. When such a correspondence is assumed, it is also necessary to solve the two problems mentioned above in the same manner as in the translation of figures.

For a system that reads handwritten figures and converts them into printed image figures, it is possible to make the handwritten sentences and the printed image sentences correspond to source sentences and translated sentences respectively. Also in this case, the two problems mentioned above must be solved.

In order to achieve the purpose mentioned above, this invention is characterized by the conversion from the first drawing data to the second drawing data accompanying the translation of the first language text into the second language text in a translating system used to translate the first figure comprising the first drawing and the first language text into the second figure comprising the second drawing and the second language text. To describe this further concretely, the desired embodiment of this invention will be comprised as follows. In the method and the system for translating the first figures comprising the first drawing and the first language text into the second figure comprising the second drawing and the second language text, the first language text is extracted and decomposed into sentences which correspond to the regions in the first drawing, the topology of the first drawing is checked and the condition to be preserved by the second drawing is extracted, and the second drawing and the placement of the second language text is determined according to the result of the translation of the extracted first language text into the second language text, as well as the extracted condition to be preserved by the second drawing.

Another desired embodiment of this invention is comprised as follows: In the method and the system used to modify a figure comprising a drawing and a text, the text is extracted from the figure and decomposed into sentences which correspond to the regions created by the drawing, and the condition to be preserved by the drawing is extracted. Then, the drawing is adjusted to the modified text while preserving the extracted condition, and the placement of the modified text in the drawing is determined.

Another desired embodiment of this invention is comprised as follows: In the method and the system used to create a figure comprising a drawing and a text, the topology and shape information of the drawing is entered, and the text data is entered corresponding to the regions created by the drawing. The drawing region is recognized and the condition to be preserved by the drawing is extracted. Then, the drawing is adjusted to the entered text and the placement of the text in the drawing is determined.

Another desired embodiment of this invention is comprised as follows. In the method and the system used to input a handwritten figure, a handwritten figure is read as binary image data, and the drawing and characters are recognized. Then, the region created by the recognized drawing is identified and the sentences are extracted from the recognized characters in reference to the identified region. Then, the topology and shape information are extracted from the recognized drawing, and the size of the display region for each extracted sentence and the local placement of the sentence in the display region are determined. After this, the positions of both the line segments comprising the drawing, and the display regions for the sentences are determined according to the extracted topology and shape of information, as well as the sizes of the display regions. The placement of the characters is then determined according to the position of the display regions and the local placement of the sentences in the display regions.

With the embodiments mentioned above, the present invention provides the following effects.

As described in the first desired embodiment of this invention, when a figure comprising a drawing and a text are translated, it is necessary to modify the drawing according to the change of the text length caused by the translation. And this invention can realize a system that allows such modification to be made automatically. The modified drawing takes over the topology and shape, as well as the visual characteristics of the source drawing. Thus, using this system would greatly reduce the translation cost of documents such as manuals containing many figures.

Again, as described in the embodiment of the system for creating figures with texts, drawing data can be entered regardless of the length of the text to be embedded in the drawing. The system provides automatic scaling (enlargement/reduction) functions necessary for embedding the text, as well as functions to adjust a drawing automatically when the embedded text is modified. Using this system would improve the efficiency of creating/modifying figures.

In addition, as described in the embodiment of the handwritten figure input system, the size and pitch of the handwritten characters can vary. When the sizes of the regions created by the handwritten drawing do not fit the normalized character size, the drawing is adjusted automatically to output well-balanced figures in size and shape. In such a way, the system can cope with the problems that arise due to the differences between handwritten data and printed image data, making the most use of the characteristics of handwritten figure entry.

Although machine translation is applied for translation of sentences extracted from figures in the embodiment of this invention mentioned above, a pre-editing step, as well as a post-editing step can also be provided for the system so that the operator may modify source language sentences, as well as the result of the machine translation. Besides, the machine translation may also be replaced with human translation. In other words, a person may translate sentences and enter the translated sentences from the keyboard.

The foregoing and other objects, advantages, manner of operation and novel features of the present invention will be understood from the following detailed description when read in connection with the accompanying drawings.

BRIEF DESCRIPTION OF THE DRAWINGS

FIGS. 3(a), 3(b), and 3(c) show an example of source figure data.

FIGS. 9(a) and 9(b) show an example of a region array.

FIGS. 12(a), 12(b), 12(c), and 12(d) show an example of source language sentence extraction.

FIG. 14 shows an example of source figure coordinates array data.

FIGS. 20(a), 20(b), 20(c), and 20(d) show an example of the condition formulae for a drawing.

FIGS. 22(a), 22(b), 22(c), 22(d), and 22(e) show an example of the local placement of target language sentences.

FIG. 29 shows an example of target figure coordinates array data.

FIGS. 32(a) and 32(b) show an example of target text composition.

FIG. 39 shows the configuration of the handwritten figure input system in the third embodiment of this invention.

DETAILED DESCRIPTION OF THE PREFERRED EMBODIMENTS

Embodiment 1

The figure translation system mentioned in the first embodiment will be explained below.

Figure 1:
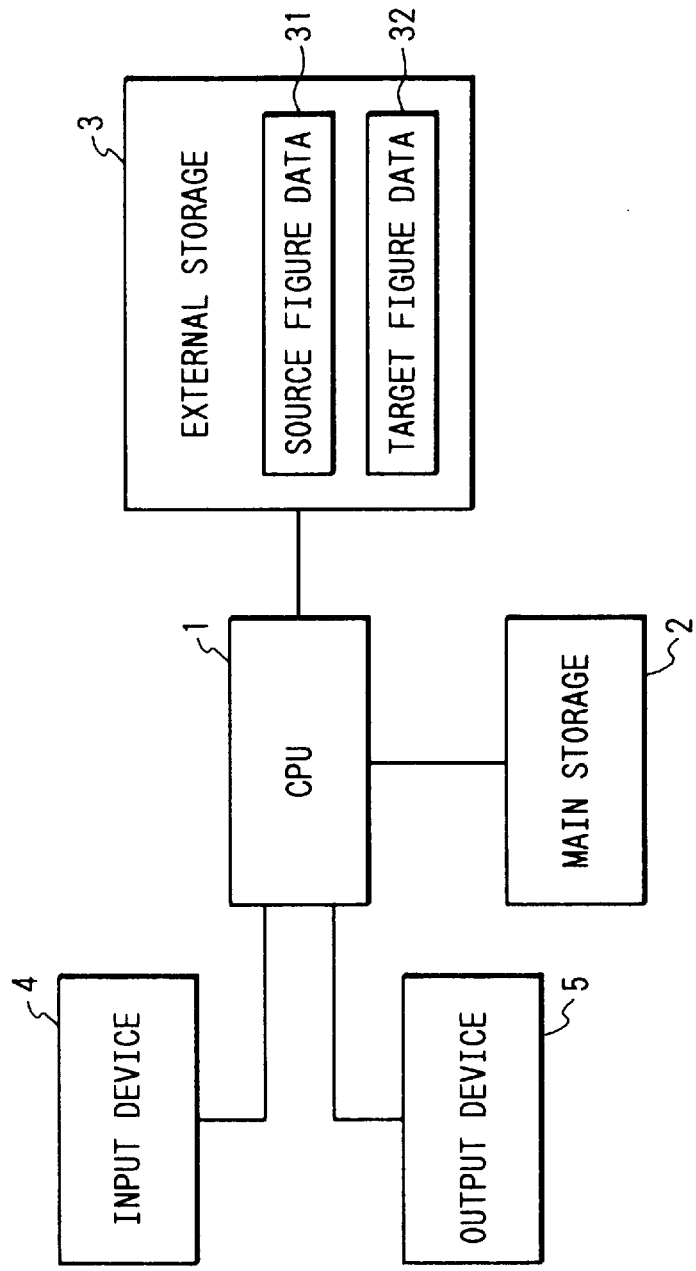
FIG. 1 shows the configuration of the figure translation system in the first embodiment.
Figure 2:
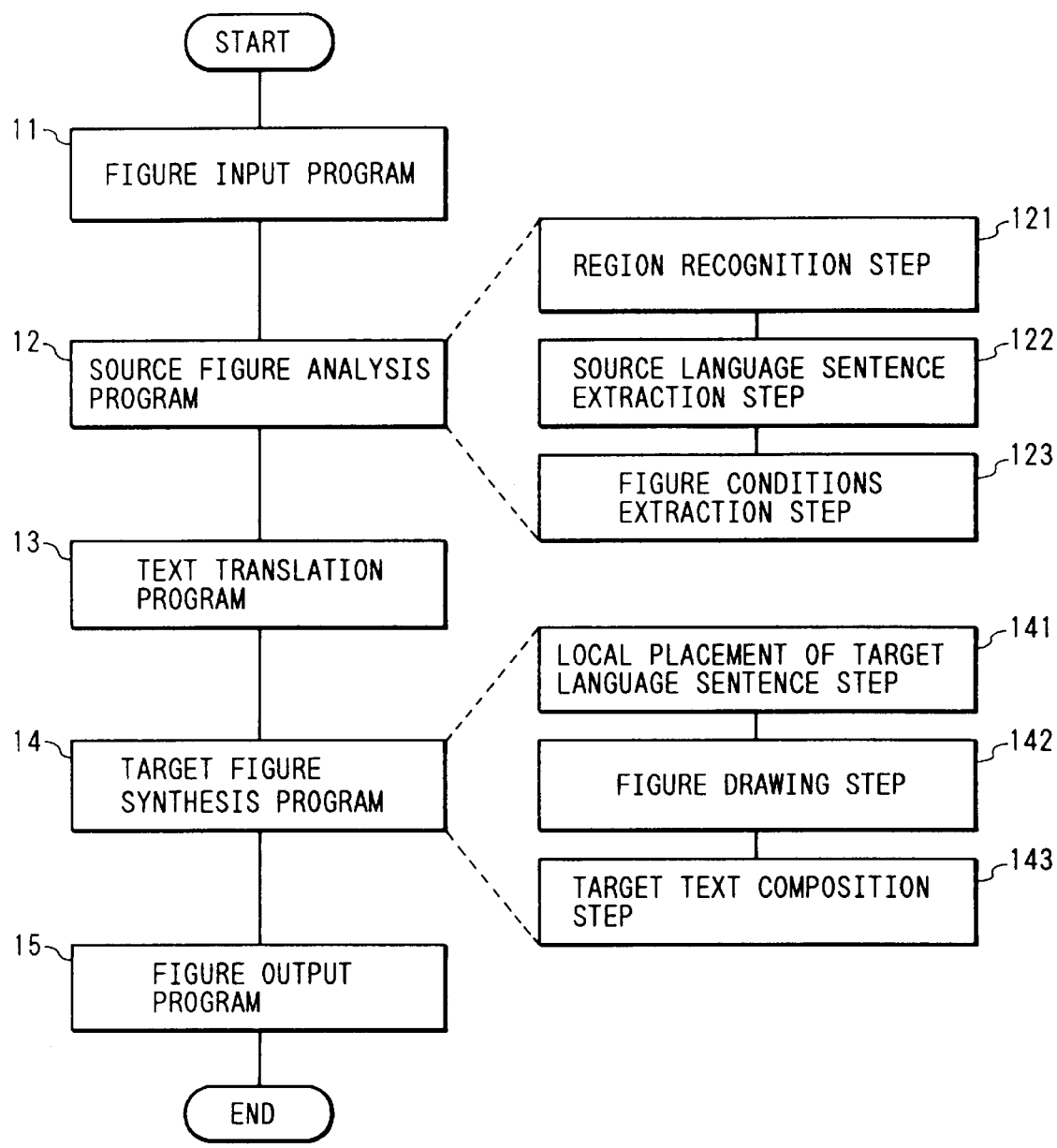
FIG. 2 shows the program steps in the figure translation system.

The figure translation system, as shown in FIG. 1, consists of CPU 1, main storage 2, external storage 3, input device 4 and output device 5. As shown in FIG. 2, the CPU 1 executes the source figure analysis program 12 and the target figure synthesis program 14, as well as the figure input program 11, the text translation program 13, and the figure output program 15. The main storage 2 is used to store those programs, as well as to store the interface information between programs. The external storage 3 is used to store source figure data 31 and target figure data 32. The input device 4 is used to enter source figures, while the output device 5 is used to output target figures.

FIG. 2 shows the program steps of the figure translation system. First, the system executes the figure input program 11 to enter a source figure through the input device 4. The figure input program 11 consists of word processor's input functions. Source figure data is composed of drawing data and text data. The source figure data is stored in the external storage 3. Then, the system executes the source figure analysis program 12. This program consists of three steps: the region recognition step 121, the source language sentence extraction step 122, and the figure conditions extraction step 123. The source figure analysis program 12 analyzes source figure data 31 stored in the external storage 3 and outputs source language sentence data and figure condition data to the main storage 2. The source language sentence data is interface information to the text translation program 13. The figure condition data is interface information to the target figure synthesis program 14. After this, the system executes the text translation program 13 to translate the source language sentence data. As a result, the target language sentence data is output to the main storage 2. Then, the system executes the target figure synthesis program 14. This program is composed of three steps: the local placement of target language sentence step 141, the figure drawing step 142, and the target text composition step 143. The target figure synthesis program 14 creates drawing data and text data from the target language sentence data and the figure condition data, and outputs those data to the external storage 3 as the target figure data 32. Finally, the system executes the figure output program 15 to read the target figure data 32 from the external storage 3 and output it to the output device 5. The figure output program 15 is composed of word processor's output/print functions. The system can also translate figures created in other devices and output translated figures to other devices when the medium is replaced in the external storage 3. In this case, neither the figure input program 11 nor the figure output program 15 is needed.

The figure input program 11 and the figure output program 15, as well known, are realized by word processor's technologies and the text translation program 13 is realized by well-known machine translation technologies. Hereafter, the source figure analysis program 12 and the target figure synthesis program 14 will be explained in detail.

First, the format of source figure data 31, which is entered to the source figure analysis program 12, and the format of target figure data 32, which is output from the target figure synthesis program 14, will be explained below.

FIG. 3 shows an example of source figure data 31. The source figure data 31 is composed of drawing data and text data. In this application example, the drawing data is assumed to be composed of line segments. Drawing data is represented by a set of line segments, each being specified with both start point and end point coordinates. FIG. 3(*a*) shows an example of drawing data. The origin in the coordinates system is defined at the upper left corner on a 2-dimensional plane. The x axis is assumed to be horizontal coordinates, while the y axis is assumed to be vertical coordinates. The horizontal row pitch on the y axis is assumed to be 2 in length. Therefore, a line segment can be drawn between rows. On the other hand, the character pitch on the x axis is assumed to be 1 in length. In other words, a vertical line is assumed to occupy a character space. The text data of the source figure data 31 is a 1-dimensional array composed of character codes and control codes such as tabulation, carriage return, etc. FIG. 3(*b*) shows an example of text data. As shown in this example, Japanese language is used for source figure text in this application example. In the text data, "→" means a tabulation code, and "↓" means a carriage return code. Text data is composed of line-format data indicating a tabulation position and real text data indicating the text that should be actually placed in a figure. FIG. 3(*c*) shows the source figure display image composed of the drawing data shown in FIG. 3(*a*) and the text data shown in FIG. 3(*b*).

Figures 4A, 4B, 4C:
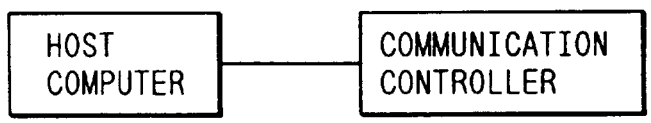
FIGS. 4(a), 4(b), and 4(c) show an example of target figure data.

The data format of the target figure data 32 is the same as that of the source figure data 31. FIG. 4(*a*) and(*b*) show examples of drawing data and text data of the target figure data 32 respectively. This text data example does not contain any line-format data. FIG. 4 (*c*) shows the target figure display image composed of the drawing data in FIG. 4(*a*) and the text data in FIG. 4(*b*).

Next, the processings of both the source figure analysis program 12 and the target figure synthesis program 14 will be outlined below.

Figure 5:
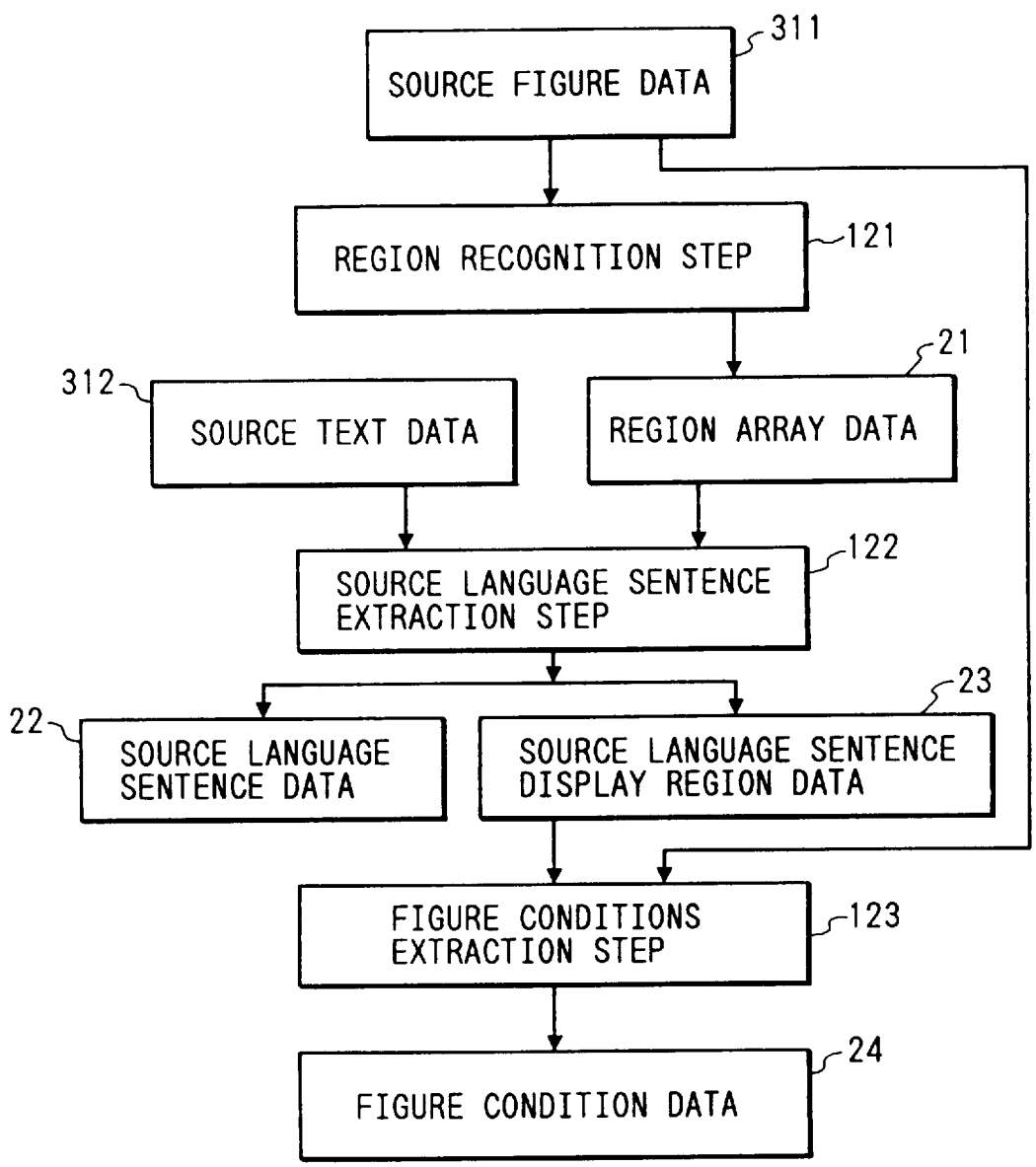
FIG. 5 shows the data flow between processing steps of the source figure analysis program.

The data flow between the processing steps of the source figure analysis program 12 is shown in FIG. 5. In the region recognition step 121, the drawing data 311 of the source figure data 31 is read and line segments are placed in a 2-dimensional array called a region array. Then, region labelling is executed for the elements of the region array. In other words, all the elements in each region enclosed by line segments are given a same label. This labelling result is output as region array data 21. In the source language sentence extraction step 122, the source text data 312 of the source figure data 31 is read and the characters of the text data are placed in a 2-dimensional array called a text array. This text array data is related to the region array data 21 and the characters placed in each region are linked to compose source language sentence data 22, each of which is a unit of translation. In addition, the source language sentence display region data 23 is also created in this step. The data 23 indicates the size and position of a rectangular region occupied by each source language sentence. In the figure conditions extraction step 123, variables are assigned to both the coordinates of the start and end points of each line segment composing a drawing, and the coordinates of the source language sentence display region. Then, the topological characteristics to be preserved in the target figure are represented as relational formulae between variables. This result is output as figure condition data 24. The characteristics of a drawing are: a line segment connects to another line segment, a line segment is horizontal/vertical, four line segments form a lozenge, a sentence display region is included in a region, and so on. One of these characteristics can be represented as a set of relational formulae between variables. So, it is possible to check if the source figure has a characteristic by substituting the coordinate values in the source figure, i.e. the source drawing data 311 and the source language sentence display region data 23, for the set of condition formulae. If a set of relational formulae is satisfied by the source figure, the set of formulae is output as figure condition data 24.

The text translation program 13 translates source language sentence data 22 into target language sentence data 25.

Figure 6:
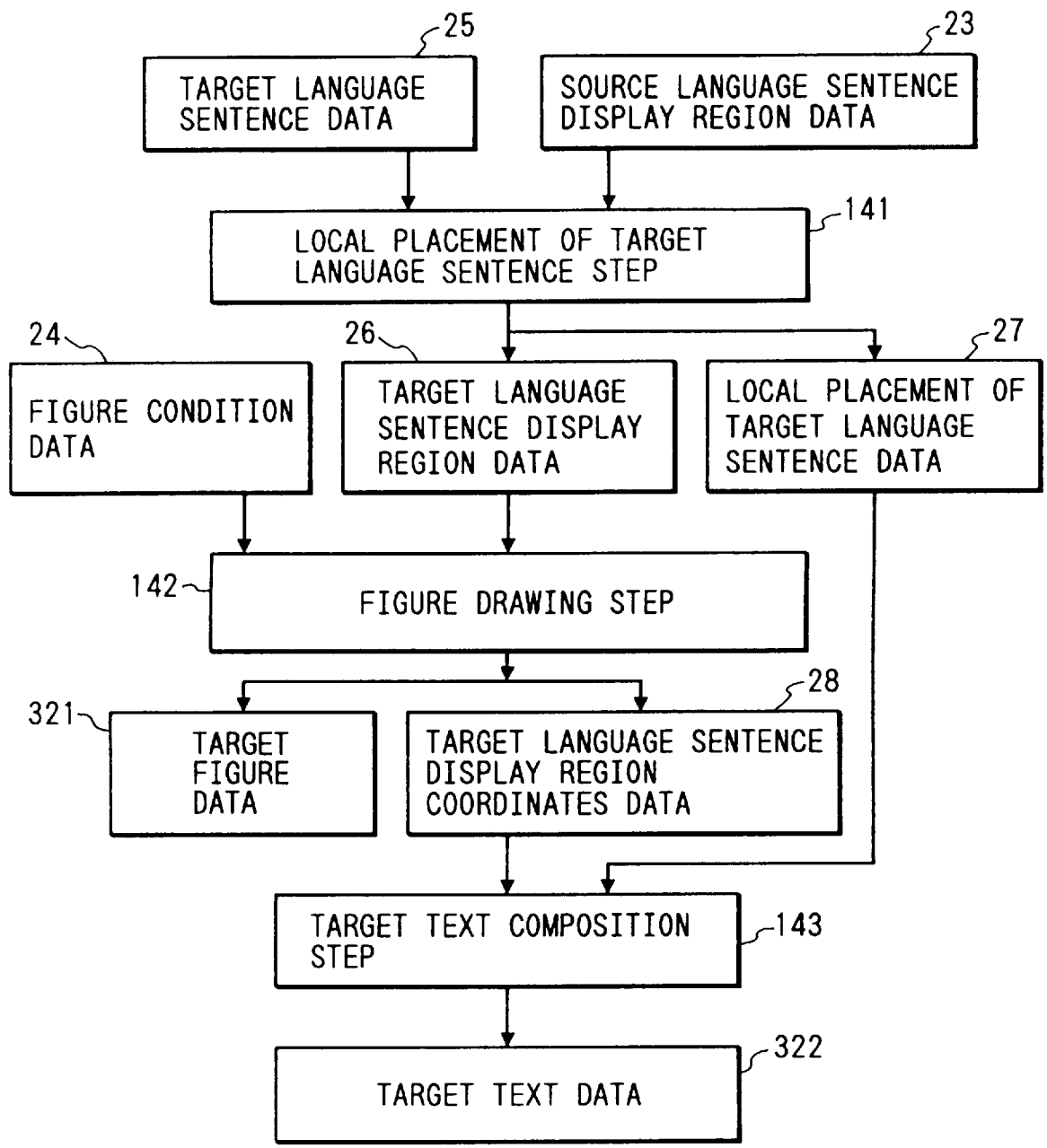
FIG. 6 shows the data flow between processing steps of the target figure synthesis program.

The data flow between the processing steps of the target figure synthesis program 14 is shown in FIG. 6. In the local placement of target language sentence step 141, target language sentence data 25 is read and the size (lengths in both x and y directions) of the target language sentence display region in the target figure is determined in reference to the source language sentence display region data 23. The result is output as target language sentence display region data 26. In the same step, the placement of the characters composing each target language sentence in the target language sentence display region is also determined. Then, the result is output as local placement of target language sentence data 27. In the figure drawing step 142, relational formulae between coordinate variables of sentence display regions and the target language sentence display region data 26 are added to the relational formulae in the figure conditions data 24, and then the coordinates satisfying these relational formulas are found. Of the coordinates, the start point and end point coordinates of line segments are output as drawing data of the target figure data 321. The rest of the coordinates are output as the target language sentence display region coordinate data 28. In the target text composition step 143, the characters of each target language sentence are placed in the 2-dimensional array that represents the whole figure according to the target language sentence display region coordinate data 28 and the local placement of target language sentence data 27, and all the characters are represented as a character string. This character string is then output as text data 322 of target figure data 32.

Processing flow of each step will be explained below in detail.

(1) Region recognition step 121

Assume that there is a 2-dimensional array used to recognize regions enclosed by line segments in a figure. This is called a region array. The region recognition step 121 consists of the line segment expansion processing to place the line segments of the drawing data 311 in the region array and the region labelling processing to label the array elements belonging to each region enclosed by line segments.

The line segment expansion is executed as follows: First, all the elements in the region array are blanked. Then, the line segments of the drawing data 311 are read sequentially, starting at line segment No."1". The elements of the region array occupied by each line segment are determined from the start point and end point coordinates of the line segment, and are labelled with the line segment number. An array element corresponding to a point at which two or more line segments connect is labelled with "0".

Figure 7:
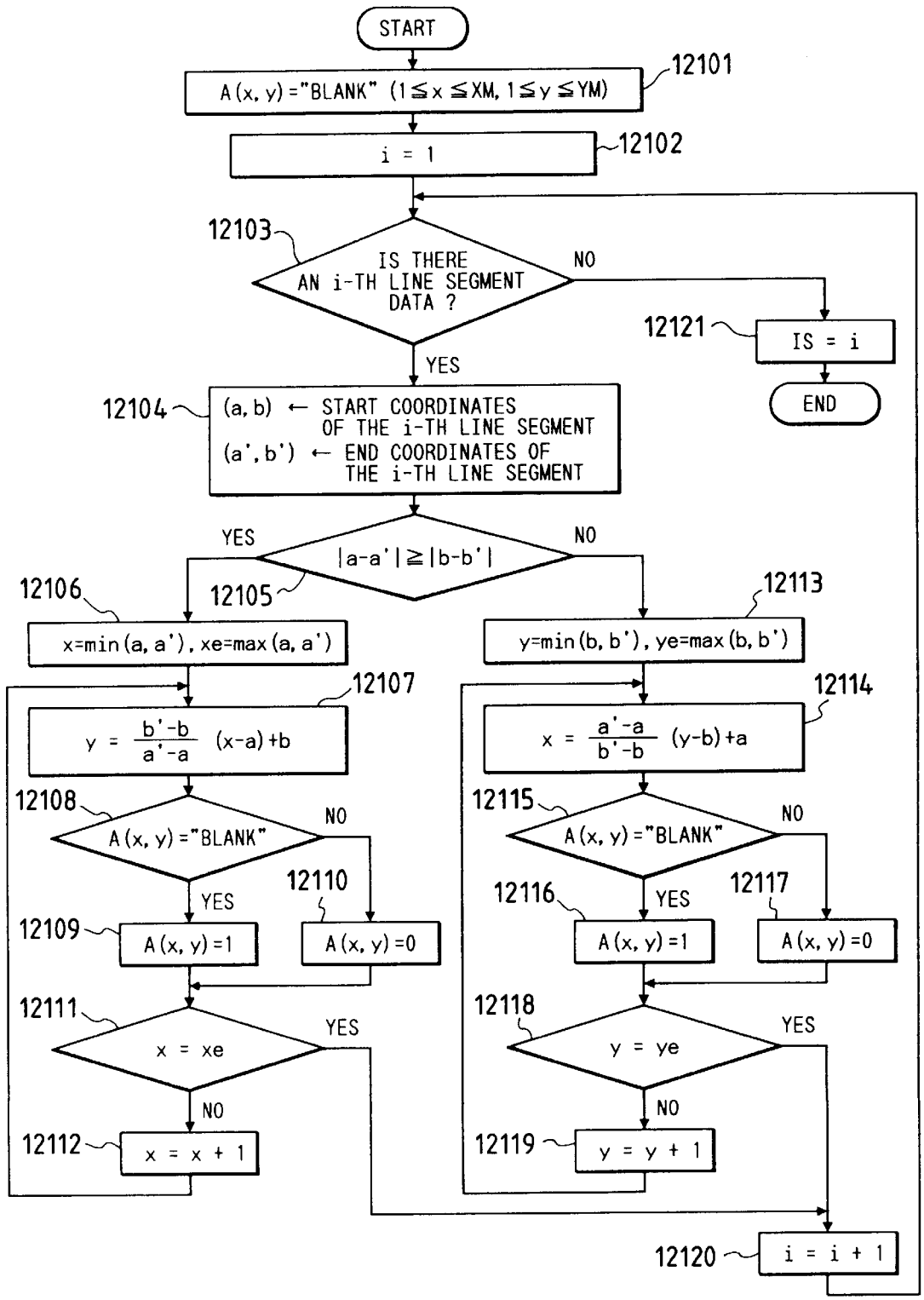
FIG. 7 shows the flow chart of the line segment expansion.

The line segment expansion processing will be explained below more in detail using the flow chart in FIG. 7.

First, all the elements A (x, y) ($1 \leq x \leq XM$, $1 \leq y \leq YM$) (wherein XM and YM indicate the maximum length of the region array A(x,y) along the X-axis and Y-axis, respectively) of the region array A are blanked (12101). Then, initial value 1 is set for the line segment number i, which indicates a line segment to be processed (12102). After this, the i-th line segment coordinates are read from the drawing data 311. If the i-th line segment is not found in the drawing data 311 (12103), the end processing (12121) is executed. If the i-th line segment is found, the start point and end point coordinates are set for (a, b) and (a', b') respectively (12104).

For the line segment whose start point and end point coordinates are set for (a, b) and (a', b'), the size of projection on the x axis is compared with the size of projection on the y axis (12105). When the projection on the x axis is larger, the x coordinate is shifted one by one to calculate the y coordinate on the line segment and plot in the region array A as follows. First, the smaller x coordinate value of the start and end points of the line segment is set for x and the larger coordinate value is set for xe (12106). Then, the y coordinate value of the point whose x coordinate value is x on the line segment is calculated (12107). In this case, the y coordinate value is rounded off to assume it as an integer. Then, a check is made to determine if the element in the region array corresponding to the coordinates (x, y) obtained is blank (12108). If it is blank, i is set for the element, indicating that the element belongs to the i-th line segment (12109). If not blank, 0 is set for the element, indicating that it is a point at which two or more line segments connect (12110). After this, x is compared with xe to check if the processing is completed for up to the end point of the line segment (12111). If not completed, 1 is added to x (12112) and the processing 12107 is executed again. If completed, 1 is added to i (12120) and the processing 12103 is executed again.

If, when a size comparison is made between projections on the x axis and on the y axis, the projection on the y axis is larger, then the y coordinate is shifted one by one to calculate the x coordinate on the line segment and plot in the region array A as follows. First, the smaller y coordinate value of the start and end points of the line segment is set for y and the larger coordinate value is set for ye (12113). Then, the x coordinate value of the point whose y coordinate value is y on the line segment is calculated (12114). In this case, the x coordinate value is rounded off to assume it as an integer. Then, a check is made to determine if the element in the region array corresponding to the coordinates (x, y) obtained is blank (12115). If it is blank, i is set for the element, indicating that the element belongs to the i-th line segment (12116). If not blank, 0 is set for the element, indicating that it is a point at which two or more line segments connect (12117). After this, y is compared with ye to check if the processing is completed for up to the end point of the line segment (12118). If not completed, 1 is added to y (12119) and the processing 12114 is executed again. If completed, 1 is added to i (12120) and the processing 12103 is executed again.

When the i-th line segment is not found in 12103, the value of i at that time is set in IS and the processing is ended (12121). The value of IS is (the last line segment number) + 1. It is used as the first region number in the subsequent region labelling.

FIG. 9(a) shows a region array obtained through the line segment expansion processing for the drawing data in FIG. 3(a). In FIG. 9(a), the elements labelled with 1 to 9 correspond to line segments No. 1 to No. 9 respectively. Element labelled 0 indicates a point at which two or more line segments connect.

The region labelling to be executed after the line segment expansion processing will be outlined below. First, a region array element whose value is blank is selected, and labelled with a region number. If another blank element is adjacent to the labelled element, it is labelled with the same region number. This processing is continued until the processing is disabled. If any blank elements are still left, one blank element is selected, and labelled with a new region number, and the same processing mentioned above is continued. This processing is continued until no blank element is left.

Figure 8:
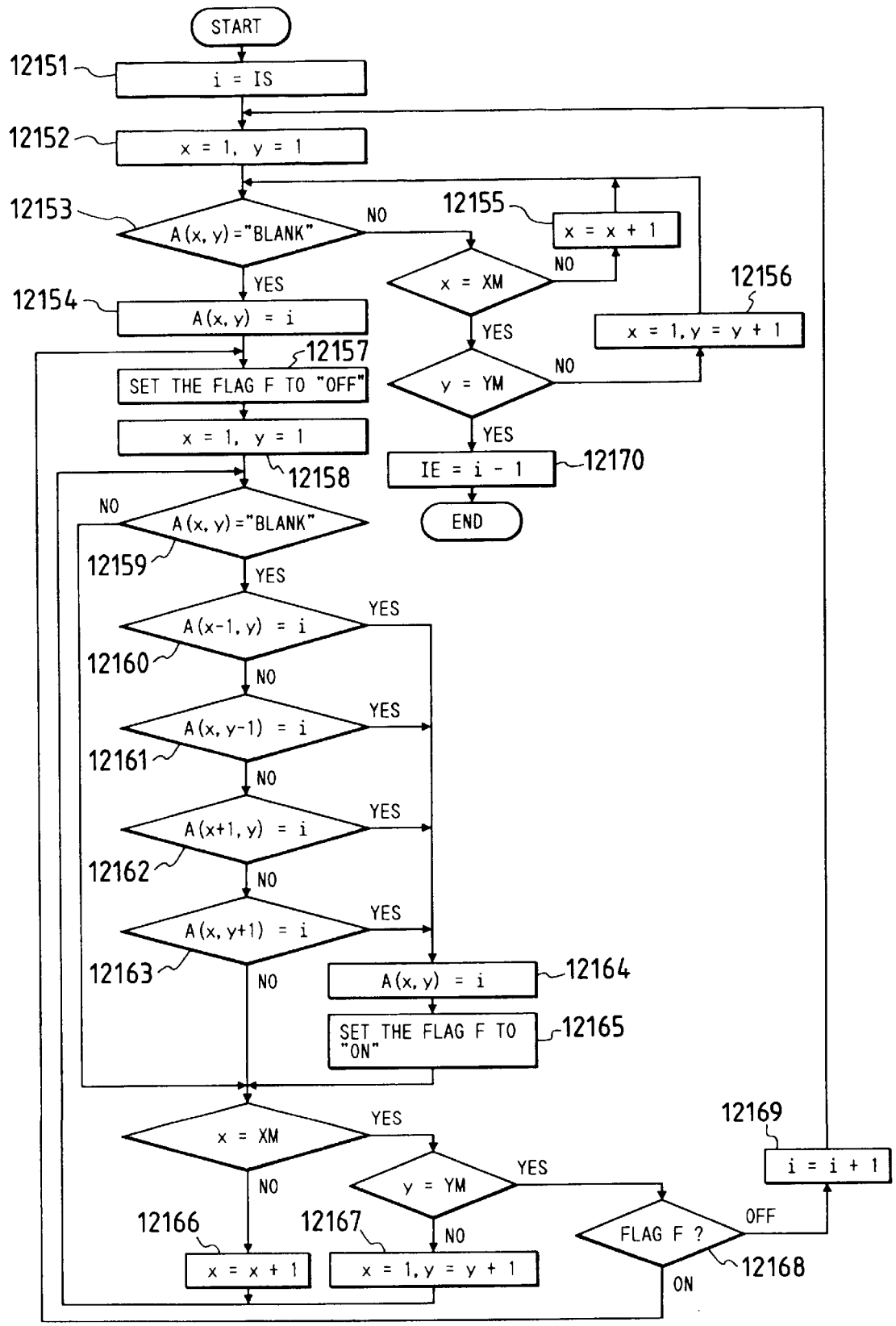
FIG. 8 shows the flow chart of the region labelling.

The details of the region labelling will be explained using the flow chart shown in FIG. 8.

The processings from 12152 to 12156, to be executed after the initial value IS is set in the region number variable i; are executed to search a blank array element and assume it as the initial element of the i-th region. First, the initial value (1, 1) is set in the index variable (x, y) indicating an array element (12152). Then, a check is made to determine if the array element A (x, y) is blank (12153). If it is blank, the region number i is set for the element (12154) and the processing 12157 is executed. If not blank, (x, y) are updated so as to indicate the right side element (12155) and the processing 12153 is executed again. If the x value reaches the right end of the region array, however, then (x, y) is updated so as to indicate the left end element on the next row (12156) and the processing 12153 is executed again. When (x, y) indicates the lower right corner element in the region array, it means that no blank element is left in the region array. So, (i−1) is set in IE (12170) and the processing is ended. The IE indicates the last region number.

The processings from 12157 to 12169 are executed to label region number i for blank elements adjacent to an element labelled with region number i one after another. First, a flag F is turned OFF (12157). The flag indicates whether or not there are any elements labelled while array scanning is made from the upper left corner to lower right corner. Then, the initial value (1, 1) is set in the index variable (x, y) indicating an array element (12158). After this, a check is made to determine if the array element A (x, y) is blank (12159). If blank, another check is made to determine if there is an i-labelled element on the left, above, right or below the array element A (x, y) (12160 to 12163). Only when an i-labelled element is adjacent to the element A(x, y), A(x, y) is labelled with the region number i (12164) and the flag F is turned ON (12165). Then, (x, y) is updated so as to indicate the right side element (12166) and the processing 12159 is executed again. If the x value reaches the right end of the region array at this time, (x, y) is updated so as to indicate the left end element on the next row (12167) and the processing 12159 is executed again. If (x, y) indicates the lower right corner element in the region array, it is checked to determine if the flag F is ON (12168). If the flag is ON, the processing 12157 is executed again, and a cycle of region number i labelling is repeated. If the flag is OFF, 1 is added to the region number i (12169) and the processing 12152 is executed again to try to recognize the next region.

FIG. 9(b) shows the result of the region labelling for a region array shown in FIG. 9(a). In FIG. 9(b), three regions No. 10 to 12 are recognized.

(2) Source language sentence extraction step 122

Assume that there is a 2-dimensional array identical to the region array in size. The 2-dimensional array is used to extract sentences from each region recognized in the region recognition step 121. This array is called a text array. The source language sentence extraction step 122 consists of the text placement processing to place the source text data 312 in a text array and the source language sentence composition processing to compose source language sentence data 22 and generate source language sentence display region data 23. The text placement processing will be outlined below. First, the line-format data of the source text data 312 is converted into internal form to make it easier to process real texts. Then, the characters comprising the real text data of the source text data 312 are written in the text array. The coordinates of each character are determined from the character/control code string in the real text data by reference to the internal form of the line-format data. The text array elements in which no characters are placed are all blanked.

The details of the text placement processing will be explained below using the flow chart shown in FIG. 10. In the flow chart, the 1-dimensional array L (x) ($1 \leq x \leq XM$) is used to store the internal form of line-format data. The 1-dimensional array T (i) ($1 \leq i \leq N$, wherein N indicates the upper limit of the array length of T(i)) is used to store real text data. And the 2-dimensional array B (x, y) ($1 \leq x \leq XM$, $1 \leq y \leq YM$) is a text array.

Figure 10:
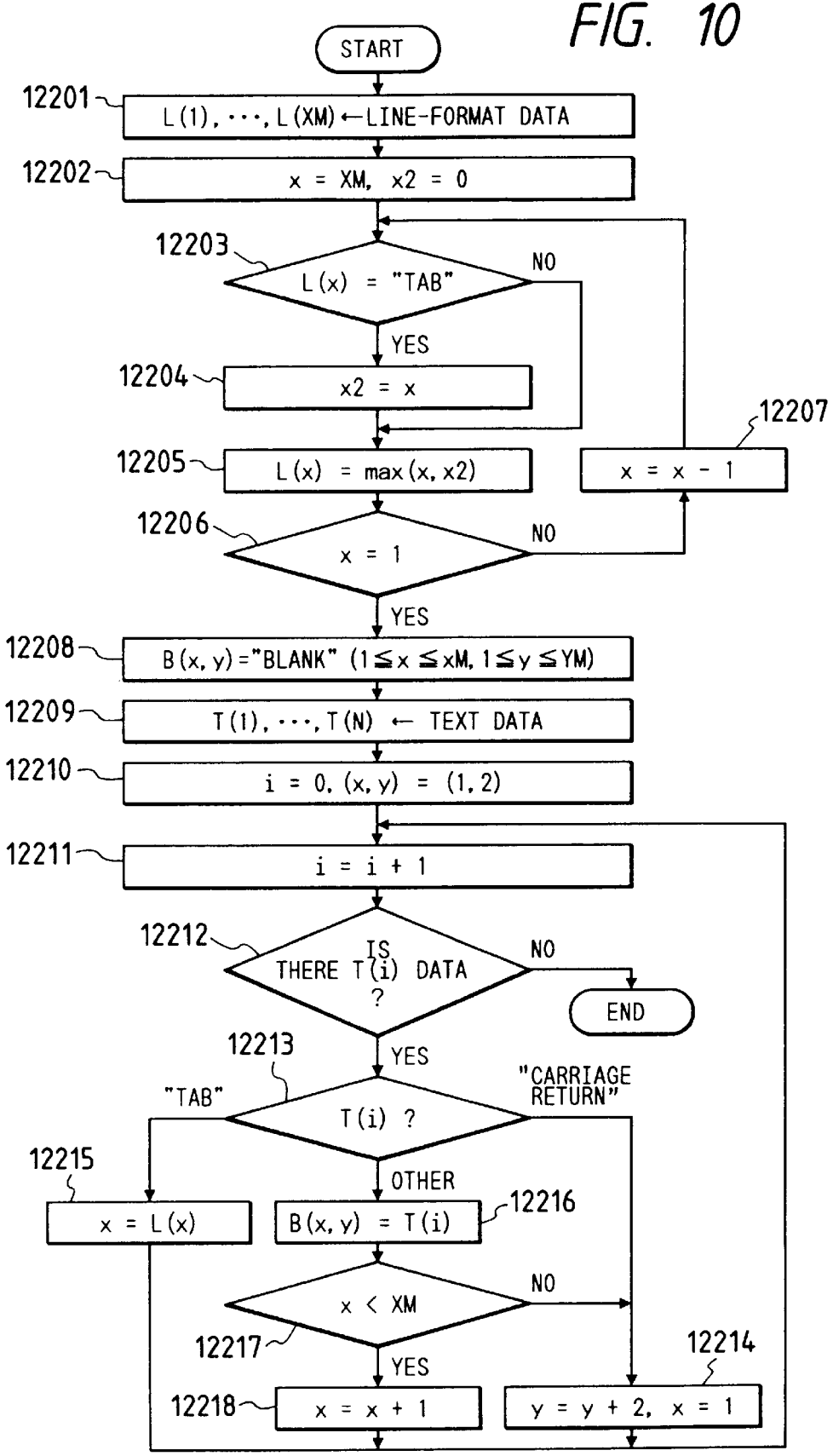
FIG. 10 shows the flow chart of the text placement.

The processings from 12201 to 12207 in the flow chart shown in FIG. 10 are executed to convert line-format data into internal form. First, the line-format data of the source text data 312 is read into L (x) ($1 \leq x \leq XM$) (12201). Then, the initial value XM is set in the index x indicating the elements in array L and 0 in the variable x2 indicating the position of shifting by tabulation (12202). After this, it is checked if L (x) is a tab (12203). If L (x) is a tab, the value of x is set in x2 (12204). Then, the maximum value of x and x2 is written in L (x) (12205). The processings from 12203 to 12205 are repeated until the value of x becomes 1 (12206) by subtracting 1 from the value of x each time (12207). As a result of the processings above, the value of L (x) indicates the column where to move when a tab appears on the x-th column.

FIG. 12(a) shows the internal form of line-format data obtained by the processings mentioned above from line-format data of the source text data 312 shown in FIG. 3(b).

The processings from 12209 to 12218 in the flow chart shown in FIG. 10 are executed to place the characters composing real text data in the text array. First, all the elements in the text array B (x, y) are blanked (12208). Then, real text data of the source text data 312 is read into T (i) (i=1, 2, . . .) (12209). At this time, for the elements of T exceeding the length of the text data, a special code is set, indicating that no data is found any longer. After this, the initial value 0 is set in the array T index and the initial value (1,2) in the array B index (x, y) (12210). Then, the processings from 12213 to 12218 are repeated while 1 is added to i (12211) as long as data is found in T (i) (12212). The processing 12213 checks the value of T (i). If T (i) is a carriage return code, (x, y) is updated so that it may indicate the left end of the next row (12214).

If T(i) is a tab, then the value of L(X) is set in x (12215). If T (i) is neither a carriage return nor a tab, then T (i) is written in B (x, y) (12216) and (x, y) is updated so that it may indicate the right side element (12218). However, if the value of x indicates the right end element in the text array (12217), (x, y) is updated so that it may indicate the left end on the next row (12214).

FIG. 12(b) shows the text array in which the source text data 312 shown in FIG. 3(b) is placed.

The source language sentence composition processing will be outlined below. Both the region array and the text array are scanned row by row from top to bottom, and each row is scanned from right to left to fetch all the characters belonging to a region. Those characters are then arranged in the order they are fetched to obtain source language sentence data 22. Of the characters belonging to a region, the leftmost character's x-coordinate xs, the rightmost character's x-coordinate xe, the uppermost character's y-coordinate ys and the lowermost character's y-coordinate ye are found. And, (xs−1, ys−1) and (xe+1, ye+1) are output as source language sentence display region data 23.

Figure 11:
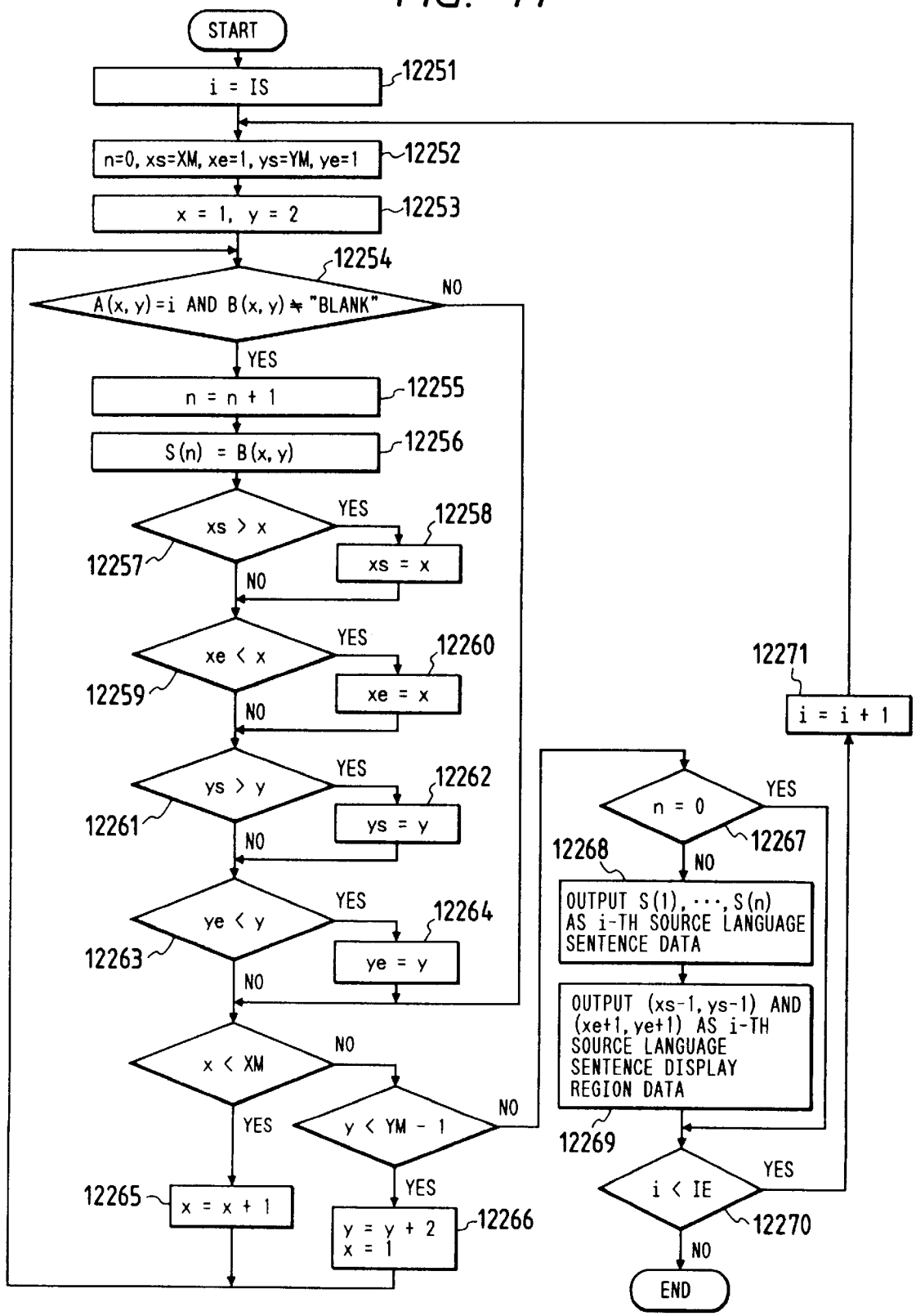
FIG. 11 shows the flow chart of the source language sentence data composition.

The details of the source language sentence composition processing will be explained below using the flow chart shown in FIG. 11. In the flow chart, A(x,y) is a region array and B(x,y) is a text array ($1 \leq x \leq XM$, $1 \leq y \leq YM$). IS and IE are the minimum and maximum, respectively of the region numbers of the regions recognized in the region recognition step 121. The 1-dimensional array S(n) is used to store the source language sentence being composed. First, the initial value IS is set in the sentence number index i (12251). Then, the initial value 0 is set in the index n for the source language sentence data array S, while the initial values XM, 1, YM, and 1 are set for the leftmost character's x coordinates xs, the rightmost character's x coordinates xe, the uppermost character's y coordinates ys, and the lowermost character's y coordinates ye respectively (12252). After this, the initial value (1, 2) is set in the index (x, y) for both the region array and the text array (12253). Next, the (x,y) element values of both the region array A and the text array B are checked (12254). When the region array element A (x, y) is i and the text array element B (x, y) is a character other than blank, the character composing the i-th source language sentence. So, the character is written in the n-th element S (n) of the source language sentence data array (12256) after 1 is added to n (12255). In addition, if the character is positioned on the left side of the xs-th column (12257), then xs is updated with the x coordinate value of the character (12258). In the same way, if the character is on the right side of the xe-th column (12259), then xe is updated with the x coordinate value of the character (12260). If the character is above the ys-th row (12261), then ys is updated with the y coordinate value of the character (12262). If the character is below the ye-th row (12263), then ye is updated with the y coordinate value of the character (12264).

Next, (x, y) is updated so that it may indicate the right side element in the region array and the text array (12265), and the processing 12254 is executed again. When x has reached the rightmost element in the region array and the text array, (x, y) is updated so that it may indicate the leftmost element on the next row (12266) and the processing 12254 is executed again. When (x, y) indicates the rightmost element on the last row, the processing 12267 is executed. In 12267, the program judges with the value of n whether or not the i-th source language sentence exists. When n is not 0, S (1), . . . S (n) are output as the i-th source language sentence data (12268), and (xs−1, ys−1) and (xe+1, ye+1) are output as the i-th source language sentence display region data (12269). After this, when i<IE (12270), 1 is added to the value of i (12271) and the processing 12252 is executed again. When i=IE, the processing is ended (12270).

FIGS. 12(c) and 12(d) show the source language sentence data and the source language sentence display region data obtained from the region array shown in FIG. 9(b) and the text array shown in FIG. 12(b) through the processings mentioned above. No values are set in the "index to coordinates array" fields in the source language sentence display region data shown in FIG. 12(d) at this stage. Values are set in the next figure conditions extraction step 123.

(3) Figure conditions extraction step 123

In the figure conditions extraction step, the drawing characteristics to be preserved by the target figure are extracted from the source figure and they are represented as condition formulae for coordinate variables. This step consists of coordinate array setting (pre-processing), generation of condition formulae related to line segment connection, generation of condition formulae related to declinations and minimum lengths of line segments, generation of condition formulae related to placement order of line segments, generation of condition formulae related to branching of line segments, and generation of condition formulae related to shapes of drawing elements. The processings in this step are executed in the order of the description above.

Figure 13:
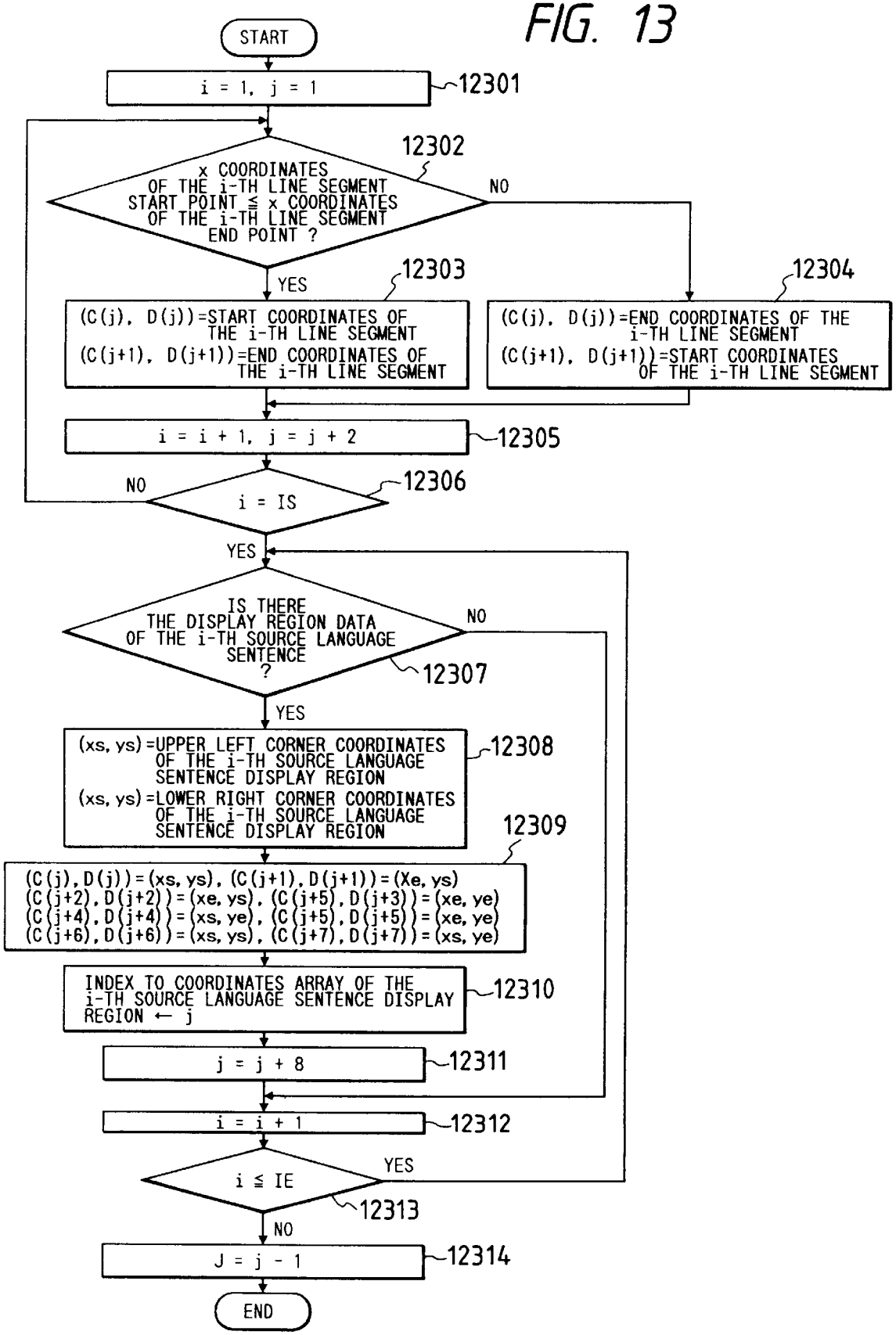
FIG. 13 shows the flow chart of the coordinate array setting.

The coordinate array setting processing reads the source figure drawing data 311 and the source language sentence display region data 23 obtained in the source language sentence extraction step 122 and sets the coordinates of the start point and end point of each line segment composing the drawing, as well as the coordinates of vertexes of the source language sentence display region, in arrays. An x coordinate array C (J) is prepared to store x coordinates, while a y coordinate array D (J) is prepared to store y coordinates. The details of the processings in this step will be explained below using the flow chart shown in FIG. 13.

First, the initial value 1 is set both in the line segment number index i and in the coordinate array index j (12301). Then, the coordinates of the start point and the end point of the i-th line segment are read from the drawing data 311 and they are set in the coordinate arrays. At this time, the smaller x coordinate of the start point and the end point is set first for simplifying the subsequent processings. In other words, when the x coordinate of the start point is smaller than that of the end point (12302), the x coordinate and y coordinate of the start point are written in C (j) and D (j) respectively, and the x coordinate and y coordinate of the end point are written in C (j+1) and D (j+1) respectively (12303). When the start point x coordinate of the start point is larger than that of the end point (12302), the x coordinate and y coordinate of the end point are written in C (j) and D (j) respectively, and the x coordinate and y coordinate of the start point are written in C (j+1) and D (j+1) respectively (12304). After this, 1 is added to i, and 2 to j (12305). When the value of i is smaller than the minimum sentence number IS (12306), the processing 12302 is executed to set the coordinates of the next line segment. When the value of i is equal to the min sentence number IS (12306), the processing 12307 is executed to set the coordinates of the source language sentence display regions.

In 12307, it is checked whether or not the i-th source language sentence display region exists. If it exists, then the coordinates of the upper left point and the lower right point are set in (xs, ys) and (xe, ye) respectively (12308). After this, (xs, ys) is written in (C (j), D(j)), (xe, ys) in (C (j+1), D (j+1)), (xe, ys) in (C (j+2), D (j+2)), (xe, ye) in (C (j+3), D (j+3)), (xs, ye) in (C (j+4), D (j+4)), (xe, ye) in (C (j+5), D (j+5)), (xs, ys) in (C (j+6), D (j+6), and (xs, ye) in (C (j+7), D (j+7)) (12309). In addition, the value of i is set in the "index to coordinate array" field in the i-th source language sentence display region data (12310). Then, 8 is added to j (12311) and 1 is added to i (12312). When i is not larger than the maximum sentence number IE (12313), the 12307 processing is executed again to set the coordinates of the next source language sentence display region. When i is larger than the max sentence number IE (12313), (j−1) is set in J (12314) and the processing is ended (12314). J indicates the total number of coordinates set in the coordinate arrays C and D.

FIG. 14 shows the coordinate arrays obtained from the drawing data shown in FIG. 3(a) and the source language sentence display region data shown in FIG. 12 (d) through the processings mentioned above.

After the coordinate arrays are set, various types of condition formulae are generated. Here, an x coordinate array X (j) and a y coordinate array Y (j) are prepared for target figure data just like the x coordinate array C (j) and the y coordinate array D (j) are prepared for source figure data. (X (j), Y (j)) and (C (j), D (j)) are coordinates of a corresponding pair of points in the target figure and in the source figure, respectively. A condition formula for X (j), Y (j) ($1 \leq j \leq J$) is generated when it is satisfied by C (j), D (j) ($1 \leq j \leq J$).

Figure 15:
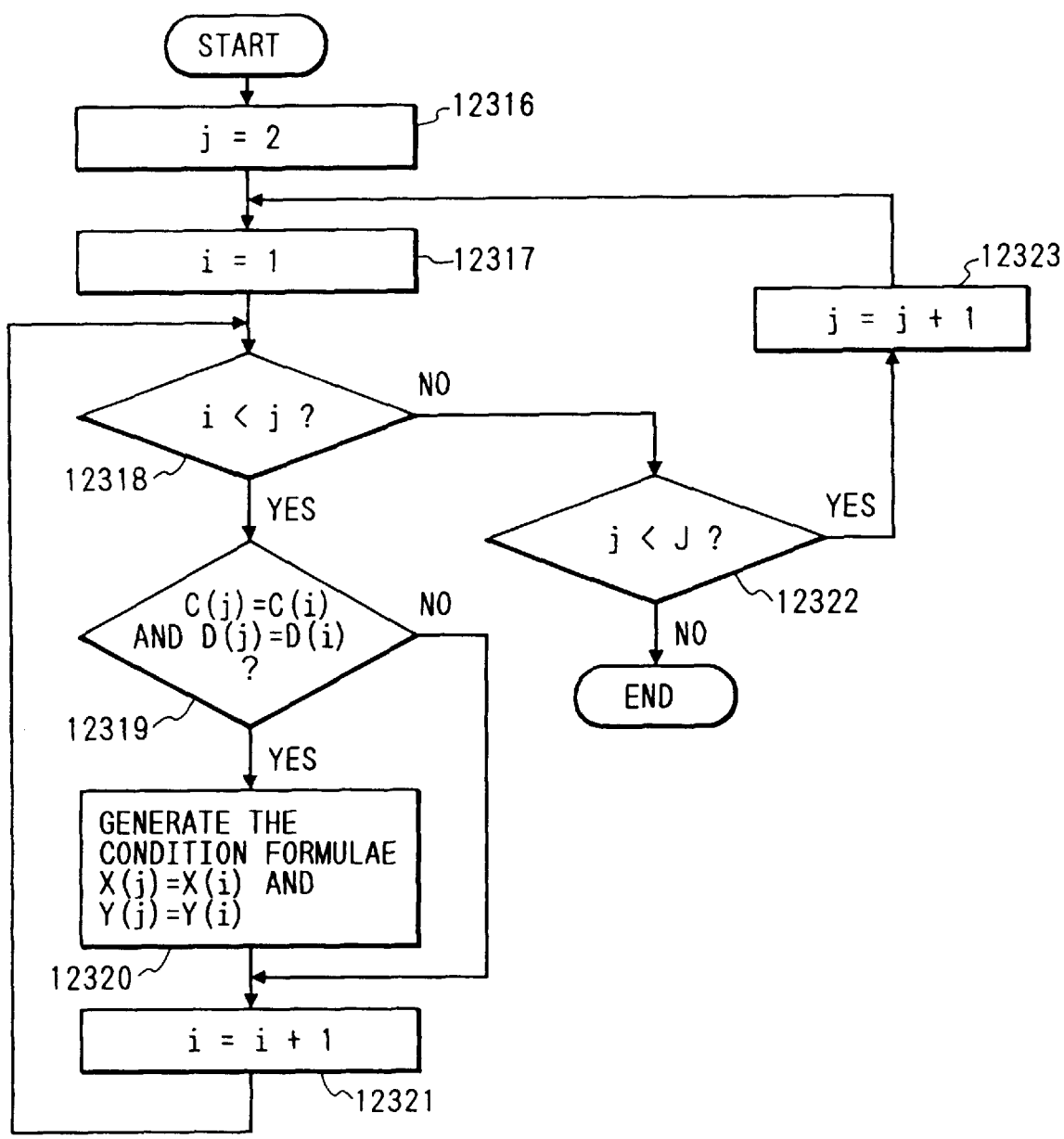
FIG. 15 shows the flow chart of the condition formula generation in relation to the line segment connection.

Condition formulae related to line segment connection are generated as follows. It is checked whether or not the coordinates of each pair of points in the source figure match. When they match, a condition that the coordinates of the corresponding two points in the target figure match is generated. The details of this processing will be explained below using FIG. 15. First, the initial value 2 is set in a coordinate array index j, which indicates one of the two points to be compared (12316). Then, the initial value 1 is set in another coordinate array index i, which indicates another point to be compared (12317). When i<j (12318), it is checked whether or not (C (j), D (j)) matches (C (i), D (i)) (12319). When they match, condition formulae X (j)=X (i), Y (j)=Y (i) are generated (12320). Then, 1 is added to i (12321), and the 12318 processing is executed again. When i is equal to j (12318), j is compared with J (total number of coordinates) (12322). When j is smaller than J (12322), 1 is added to j (12323) and the processing 12317 is executed again. When j is equal to J (12322), the processing is ended.

FIG. 20(a) shows some of the condition formulae generated from the coordinate arrays shown in FIG. 14 through the processings mentioned above.

Figure 16:
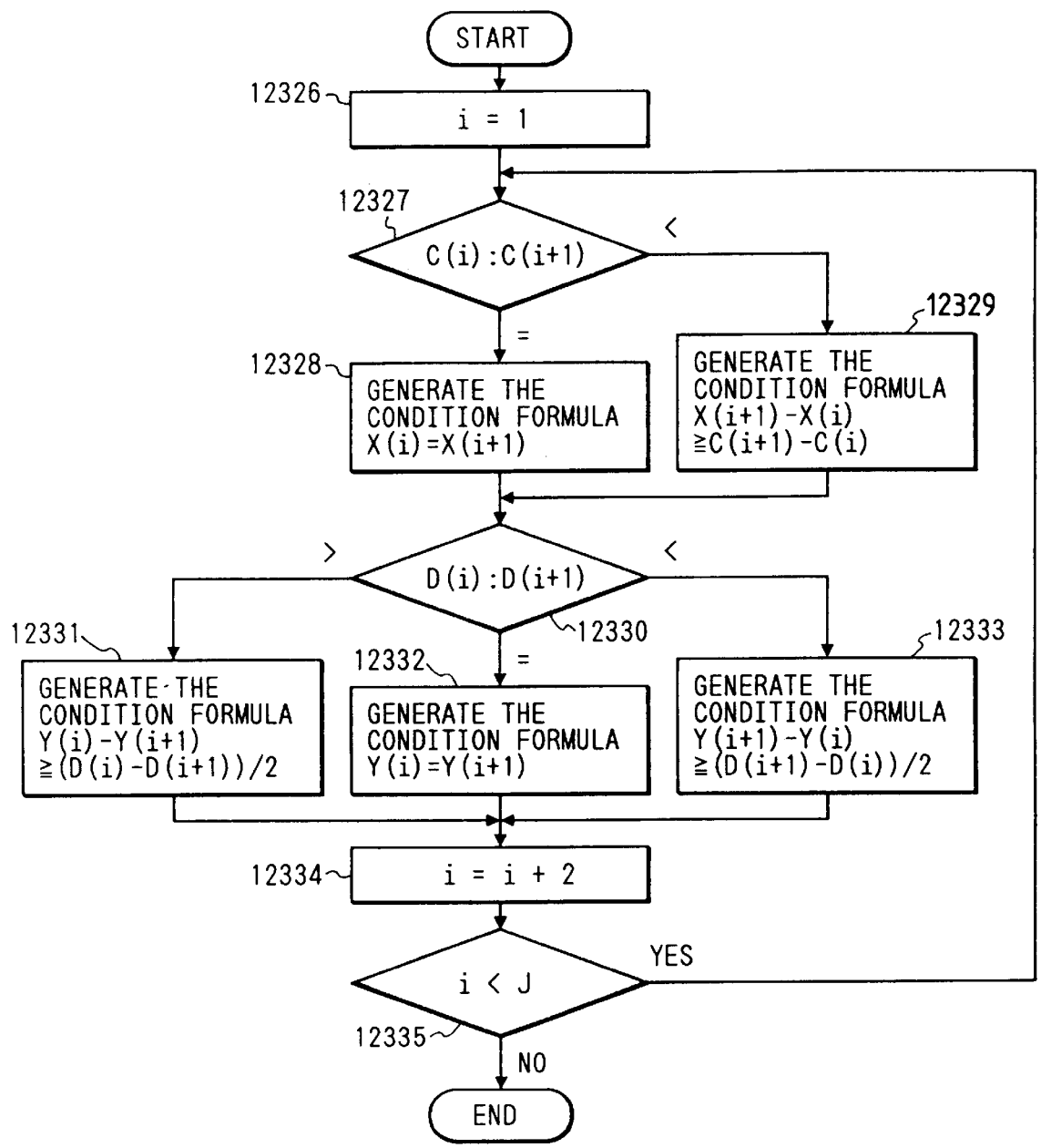
FIG. 16 shows the flow chart of the condition formula generation in relation to the inclinations and the minimum lengths of line segments.
Figure 17:
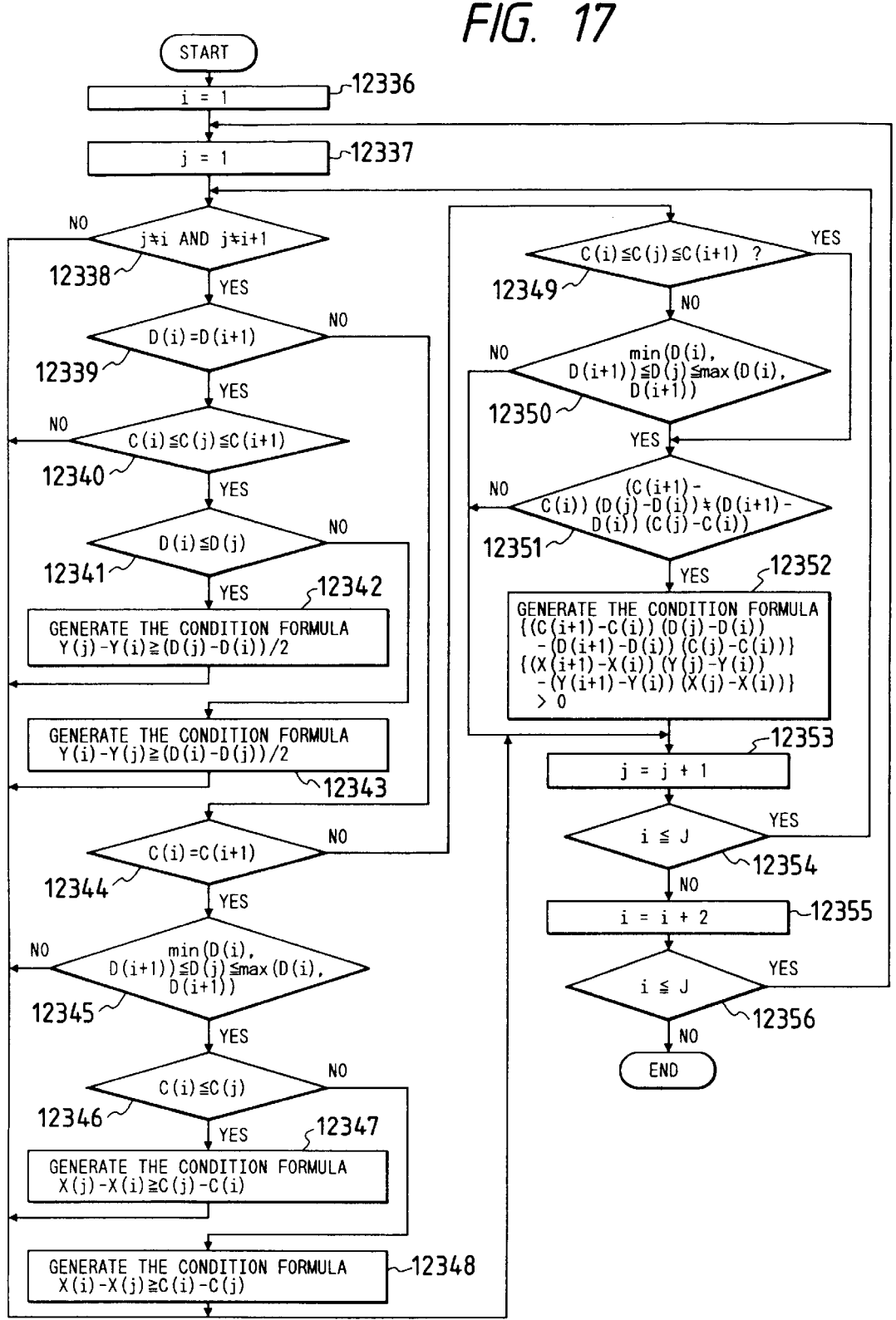
FIG. 17 shows the flow chart of the condition formula generation in relation to the placement order of line segments.

Condition formulae related to the declination and the minimum length of line segments are generated as follows. It is checked whether each line segment in the source figure is horizontal, vertical, right side up, or right side down. When it is horizontal, a condition that the corresponding line segment in the target figure is also horizontal is generated. When it is vertical, a condition that the corresponding line segment in the target figure is also vertical is generated. When it goes up on the right side, a condition formula that the corresponding line segment also goes up on the right side is generated. When it goes down on the right side, a condition formula that the corresponding line segment also goes down on the right side is generated. In addition, a condition that the projection onto the x (y) axis of the line segment in the target figure is larger than (a coefficient) x (the projection onto the x (y) axis of the line segment in the source figure) is generated. In this application example, the coefficient is assumed to be 1 for the projection onto the x axis and ½ for the projection onto the y axis. The reason why the coefficient differs between x and y axes is due to consideration of the difference of character width in the Japanese and English languages. The details of generating condition formulae related to the declination and the minimum length of line segments will be explained below using FIG. 16.

First, the initial value 1 is set in the coordinate array index i indicating the line segment to be checked (12326). Then, it is checked whether or not C (i) is equal to C (i+1) (12327). If they are equal, a condition formula X (i)=X (i+1), which means that the line segment is vertical, is generated (12328). When C (i)<C (i+1), a condition formula X (i+1)−X (i)>C (i+1)−C (i) related to the projection onto the x axis is generated (12329). There is no case of C (i)>C (i+1). In the same way, D (i) is compared with D (i+1) (12330). When D (i)>D (i+1), a condition formula Y (i)−Y (i+1)>(D (i)−D (i+1))/2 related to the projection onto the y axis is generated (12331).

When D (i)=D (i+1), a condition formula Y (i)=Y (i+1), which means that the line segment is horizontal, is generated (12332). When D (i)<D (i+1), a condition formula Y (i+1) −Y (i)≧(D (i+1)−D (i))/2, which is related to the projection onto the y axis, is generated (12333). After this, 2 is added to i (12334). And when i is not larger than J (total number of the coordinates data) (12335), the 12327 processing is executed again. When i is larger than J, the processing is ended (12335).

FIG. 20(*b*) shows some of the condition formulae generated from the coordinate arrays shown in FIG. 14 through the processings mentioned above.

The processing to generate condition formulae related to placement order of line segments is executed to preserve the order in the y axis direction of the line segments whose projections onto the x axis overlap and the order in the x axis direction of the line segments whose projections onto the y axis overlap, as well as to prevent line segments from coming too close to each other. The details of the processing will be explained below using FIG. 16. First, the initial value 1 is set both in a coordinate array index i indicating the first line segment (12336) and in another coordinate array index j indicating the second line segment (12337). After this, it is checked whether or not j≠i and j≠i+1. In other words, it is checked whether or not the first line segment differs from the second line segment (12338). When they are the same line segment, the 12353 processing is executed to update the value of j.

When the first line segment differs from the second one, it is checked whether or not D (i)=D (i+1). In other words, it is checked whether or not the first line segment is horizontal (12339). When it is horizontal, it is checked whether or not C (i)≦C (j)≦C (i+1). In other words, it is checked whether or not the projection onto the x axis of the first line segment includes that of the second line segment (12340). When C (i)≦C (j)≦C (i+1), D (i) is compared with D (j) (12341). When D (i)≦D (j), a condition formula Y (j)−Y (i)≧(D (j)−D (i))/2 is generated (12342). When D (i)>D (j), a condition formula Y (i)−Y (j)≧(D (i)−D (j))/2 is generated (12343). When not C (i)≦C (j)≦C (i+1) (12340), the processing 12353 is executed.

When the first line segment is not horizontal (12339), it is checked whether or not C (i)=C (i+1), that is, whether or not the first line segment is vertical (12344). When it is vertical, it is checked whether or not min (D (i), D (i+1))≦D (j)≦max (D (i), D (i+1)), that is, whether or not the projection onto the y axis of the first line segment includes that of the second line segment (12345). When min (D (i), D (i+1))≦D (j)≦max (D (i), D (i+1)), C (i) is compared with C (j) (12346). When C (i)≦C (j), a condition formula X (j)−X (i)≧C (j)−C (i) is generated (12347). When C (i)>C (j), a condition formula X (i)−X (j)≧C (i)−C (j) is generated (12348). When not min (D (i), D (i+1))≦D (j)≦max (D (i), D (i+1)) (12345), the processing 12353 is executed.

When D (i)≠D (i+1) and C (i)≠C (i+1), that is, when the first line segment is neither horizontal nor vertical, it is checked whether or not C (i)≦C (j)≦C (i+1), that is, whether or not the projection onto the x axis of first line segment includes that of the second line segment (12349). When not C (i)≦C (j)≦C (i+1), it is checked whether or not min (D (i), D (i+1))≦D (j)≦max (D (i), D (i+1)), that is, whether or not the projection onto the y axis of the first line segment includes that of the second line segment (12350). When C (i)≦C (j)≦C (i+1) or min (D (i), D (i+1))≦D (j)≦max (D (i), D (i+1)), it is checked whether or not (C (i)−C (i+1)) (D (j) D−D (i))≠(D (i)−D (i+1) (C (j)−C (i)), that is, whether or not the second line segment is apart from the first line segment (12351). When the second line segment is apart from the first line segment, a condition ((C (i)−C (i+1)) (D (j)−D (i))−(D (i) D−(i+1)) (C (j)−C (i))) ((X (i)−X (i+1)) (Y (j) Y (j)−Y (i))−(Y (i)−Y (i+1)) (X (j)−X (i)))>0 is generated so that the relative position of the second line segment against the first line segment may be preserved in the target figure (12352).

After this, 1 is added to j (12353). When j is not larger than J (total number of the coordinate data) (12354), the processing 12338 is executed again. When j is larger than J, 2 is added to i (12355). When i is not larger than J (total number of the coordinate data) (12356), the processing 12337 is executed again. When i is larger than J (12356), the processing is ended.

FIG. 20(*c*) shows part of the condition formulae generated from the coordinate arrays shown in FIG. 14 through the processings mentioned above.

Figure 18:
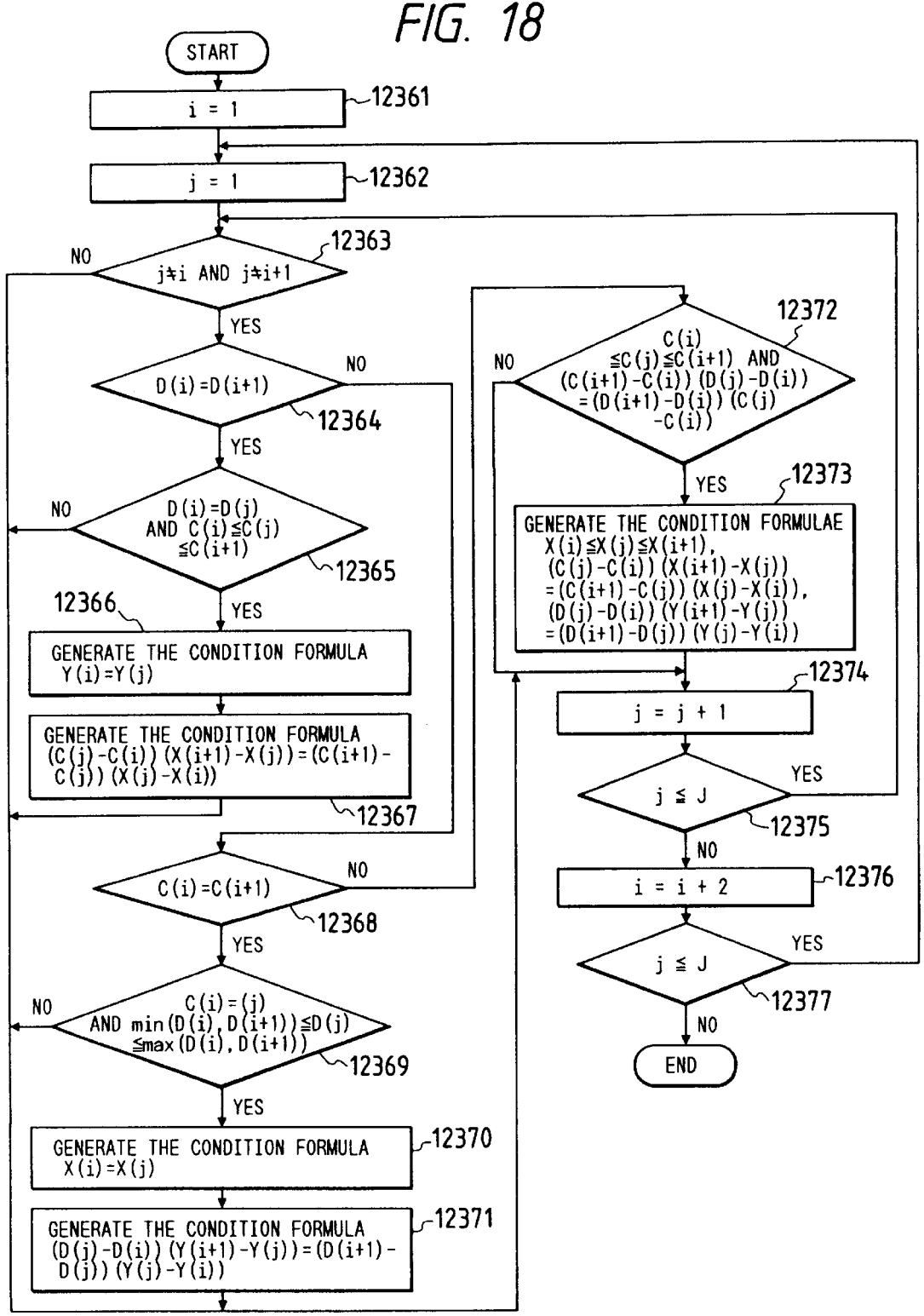
FIG. 18 shows the flow chart of the condition formula generation in relation to the branching of line segments.

The processing to generate condition formulae related to branching of line segments, when a line segment starts from another line segment in the source figure, obtains the ratio of splitting the latter line segment by the former line segment as a condition for the target figure. The details of this processing will be explained below using FIG. 18. First, the initial value 1 is set both in a coordinate array index i indicating the first line segment (12361), and in another coordinate array index j indicating the second line segment (12362). After this, it is checked whether or not j≠i and j≠i+1. In other words, it is checked whether or not the first line segment differs from the second line segment (12363). When they are the same line segment, the 12374 processing is executed to update the value of j.

When the first line segment differs from the second one, it is checked whether or not D (i)=(i+1). In other words, it is checked whether or not the first line segment is horizontal (12364). When it is horizontal, it is checked whether or not D (i)=D (j) and C (i)≦C (j)≦C (i+1). In other words, it is checked whether or not the second line segment starts from on the first line segment (12365). When the second line segment starts from on the first line segment, a condition formula Y (i)=Y (j) is generated (12366) indicating it. In addition, a condition formula (C(j)−C (i)) (X (i+1)−X (j)) =(C (i+1)−C (j)) (X (i)−X (i)) is generated (12367) to preserve the split ratio.

When the first line segment is not horizontal (12364), it is checked whether or not C (i)=C (i+1), that is, whether or not the first line segment is vertical (12368). When the first line segment is vertical, it is checked whether or not C (i)=C (j) and min (D (i), D (i+1))≦D (j)≦max (D (i), D (i+1)), that is, whether or not the second line segment starts from on the first line segment (12369). When the second line segment starts from on the first line segment, a condition formula X(i)=X(j) is generated (123670) indicating such. In addition, a condition formula (D (j)−D (i)) (Y (i+1)−Y (j))=(D (i+1) −D (j)) (Y (j)−Y (i)) is generated (12371) to preserve the split ratio.

When D (i)≠D (i+1) and C (i)≠C (i+1), that is, when the first line segment is neither horizontal nor vertical, it is checked whether or not C (i)≦C (j)≦C (i+1) and (C (i+1)−C (j)) (D (j)−D (i))=(D (i+1)−D (j)) (C (j)−C (i)), that is, whether or not the second line segment starts from on the first line segment (12372). When the second line segment starts from on the first line segment, a condition formulae X (i)≦X (j)≦X (i+1), (C (j)-C (i)) (X (i+1)-X (j))=(C (i+1)-C (j)) (X (j)-X (i), and (D (j)-D (i)) (Y (i+1)-Y (j))=(D (i+1)-D (j)) (Y (j)-Y (i)) are generated (12373) to preserve the split ratio.

After this, 1 is added to j (12374). When j is not larger than J (total number of the coordinate data) (12375), the processing 12363 is executed again. When j is larger than J, 2 is added to i (12376). When i is not larger than J (total number of the coordinate data) (12377), the processing 12362 is executed again. When i is larger than J (12377), the processing is ended.

FIG. 20(d) shows some of the condition formulae generated from the coordinate arrays shown in FIG. 14 through the processings mentioned above.

Figure 19:
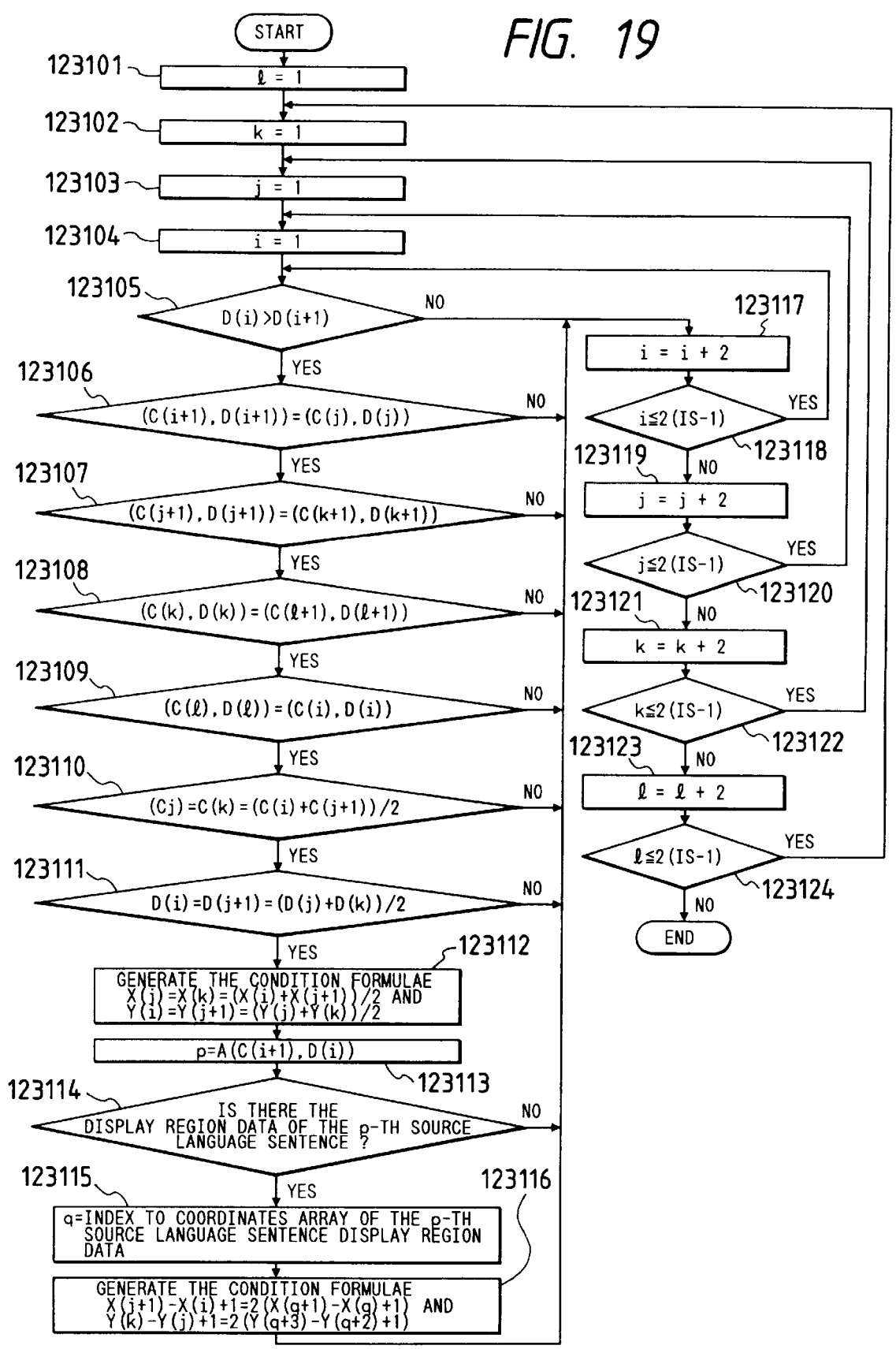
FIG. 19 shows the flow chart of the condition formula generation in relation to lozenge indicating branching.

The processing to generate condition formulae related to a lozenge whose diagonal is vertical/horizontal will be explained as an example of generating condition formulae related to the shapes of drawing elements using FIG. 19. First, the initial value 1 is set in the fourth coordinate array index l indicating the fourth line segment (123101), in the third coordinate array index k indicating the third line segment (123102), in the second coordinate array index j indicating the second line segment (123103) and in the first coordinate array index i indicating the first line segment (123104). Then, it is checked whether or not D (i)>D (i+1), that is, whether or not the first line segment goes up on the right side (123105). If not, the processing 123117 is executed to update the coordinate array indexes. When the line segment goes up on the right side, it is further checked whether or not (C (i+1), D (i+1))=(C (j), D (j)), that is, whether or not the end point of the first line segment is identical to the start point of the second line segment (123106). If not, the processing 123117 is executed to update the coordinate array indexes. Then, it is checked whether or not (C (j+1), D (j+1))=(C (k+1), D (k+1)), that is, whether or not the end point of the second line segment is identical to the start point of the third line segment (123107). If not, the processing 123117 is executed to update the coordinate array indexes. Then, it is checked whether or not (C (k), D (k))=(C (l+1), D (l+1)), that is, whether or not the end point of the third line segment is identical to the start point of the fourth line segment (123108). If not, the processing 123117 is executed to update the coordinate array indexes. Then, it is checked whether or not (C (l), D (i))=(C (i), D (i)), that is, whether or not the end point of the fourth line segment is identical to the start point of the first line segment (123109). If not, the processing 123117 is executed to update the coordinate array indexes. Then, it is checked whether or not C (j)=C (k)=(C (i)+C (j+1))/2, that is, bilaterally symmetrical or not (123110). If not, the processing 123177 is executed to update the coordinate array indexes. Then, it is checked whether or not (D (i)=D (j+1)=(D (j)+D (k))/2, that is, vertically symmetrical or not (123111). If not, the processing 123117 is executed to update the coordinate array indexes.

When 123105 through 123111 are satisfied, the four line segments forms a lozenge whose diagonal is vertical/horizontal. So, condition formulae X (j)=X (k)=(X (i)+X (j+1))/2 and Y (i)=Y (j+1)=(Y (j)+Y (k))/2 are generated (123112). In addition, the value of the region array element A (C (i+1), D (i)) corresponding to the center point in the lozenge is set in p (123113). "p" indicate the region number of the lozenge. It is checked whether or not the p-th source language sentence display region data exists (123114). If it exists, the value of its index to coordinate array is set in q (123115). Then, condition formulae X (j+1)-X (i)+1=2 (X (q+1)-X (q)+1) and Y (k)-Y (j)+1=2 (Y (q+3)-Y (q+2)+1) are generated (123116). These condition formulae mean that the rectangle connecting the center point of each side of the lozenge is assumed as the target language sentence display region within the lozenge.

After those condition formulae are generated, 2 is added to i (123117). When i is not larger than 2 (IS-1) (total number of the start points and end points of the line segments) (123118), the processing 123105 is executed again. When i is larger than 2 (IS-1) (123118), 2 is added to j (123119). And when j is not larger than 2 (IS-1) (123120), the processing 123104 is executed again. When j is larger than 2 (IS-1) (123120), 2 is added to k (123121). And when k is not larger than 2 (IS-1) (123122), the processing 123103 is executed again. When k is larger than 2 (IS-1) (123122), 2 is added to l (123123). When l is not larger than 2 (IS-1) (123124), the processing 123102 is executed again. When l is larger than 2 (IS-1) (123124), the processing is ended.

The processing to generate condition formulae related to a lozenge mentioned above is an example of the processing to preserve the shapes of drawing elements. Condition formulae can also be generated for conditions to keep squares as squares not as rectangles, to keep parallel line segments at equal intervals for tables as are, to keep congruent drawing elements as are, and others. How to generate those condition formulae is omitted here, however.

(4) Local placement of target language sentence step 141

Target language sentence data 25 is obtained by the text translation program 13 translating each sentence of the source language sentence data 22 extracted in the source language sentence extraction step 122. FIG. 22(a) shows the target language sentence data obtained from the source language sentence data shown in FIG. 12(c).

The local placement of target language sentence step 141 processing determines the lengths in both x and y directions of the rectangular display region for each target language sentence in the target figure, and places the characters of the target language sentence in the display region. Usually, the number of characters differs between source language sentence and target sentence. In general, for translation from Japanese into English, the number of characters increases. So, the length (the number of characters) in x direction of the target language sentence display region should be longer than that of the source language sentence display region. The number of lines should not be increased to an extreme so as not to spoil the ease of reading. So, at first the length in x direction is enlarged. The enlargement ratio in x direction against the source language sentence display region is selected from a number of pre-determined values. When the maximum enlargement in x direction is insufficient, the length in y direction is enlarged.

Figure 21:
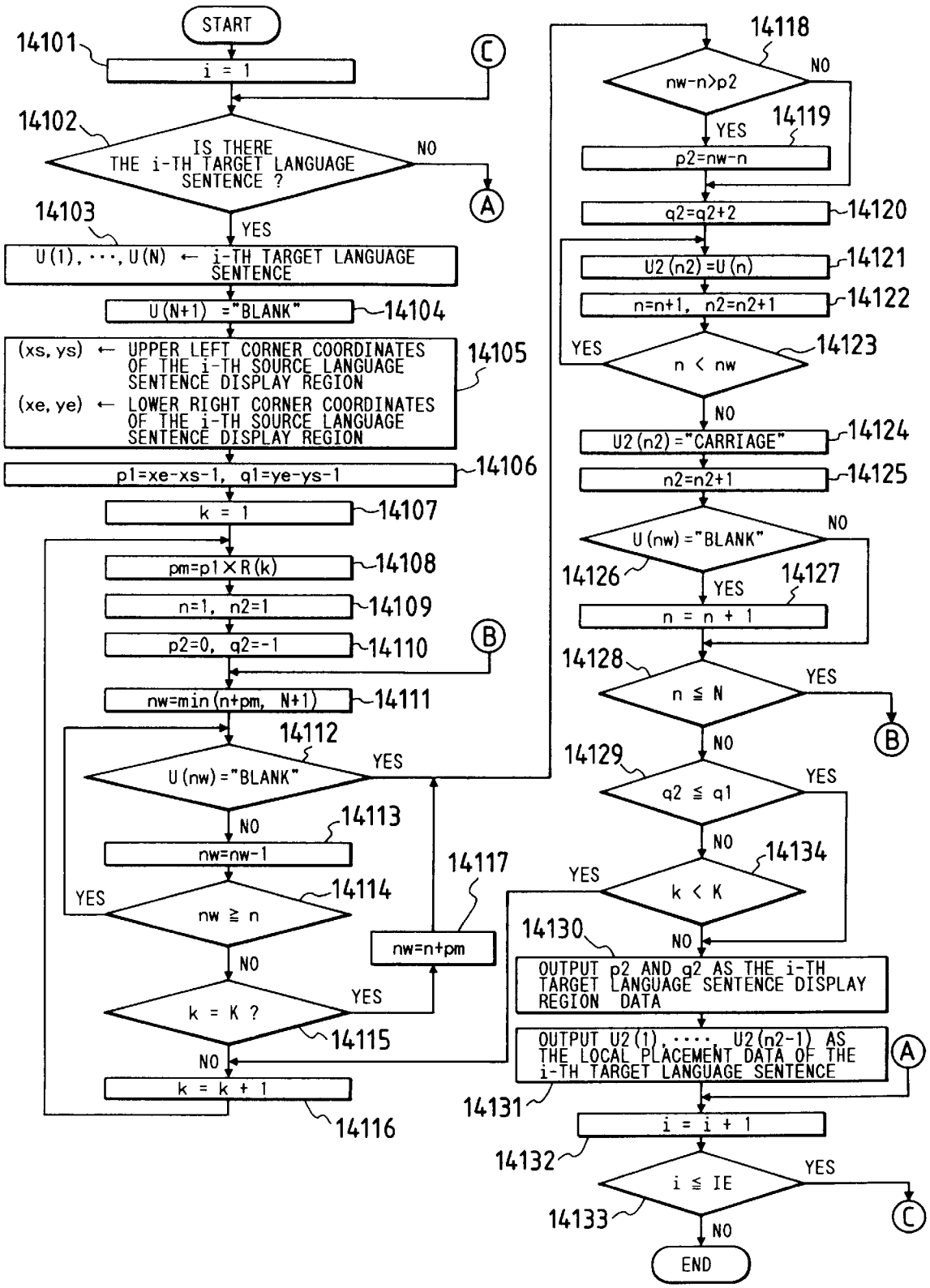
FIG. 21 shows the flow chart of the local placement of target language sentences.

The details of the local placement of target language sentence step 141 will be explained below using the flow chart shown in FIG. 21. The predetermined enlargement ratios in x direction against the source language sentence display region are R (1), . . . , R (K) (R (k)<R (k+1)). The concrete value, for example, will be R (1)=1.5, R (2)=2.0, R (3)=2.5, R (4)=3.0, R (5)=3.5, and R (6)=4.0. First, the initial value 1 is set in the sentence number index i (14101). When the i-th target language sentence is found (14202), it is read and written in the target language sentence array U (14103). When the length of the target language sentence is assumed to be N, characters are set in U (1), . . . , U (N). Then, a blank is set in U (N+1) to indicate the end of the target language sentence (14104). After this, the i-th source language sentence display region data is read and the coordinates of the upper left point and the lower right point of the region are set in (xs, ys) and (xe, ye) respectively (14105). Then, the length (number of characters) of the source language sentence display region in x direction xe−xs−1 and that in y direction ye−ys−1 are calculated, and are set in p1 and q1 respectively (14106). This completes the preparation for the processing of the i-th target language sentence. When the i-th target language sentence is not found (14102), the processing 14132 is executed to update the value of i.

When the preparation for the processing of the i-th target language sentence ends, the initial value 1 is set in the index k indicating the x direction enlargement ratios (14107). Then, p1xR(k) is set in pm (max length in x direction of the target language sentence display region) (14108). The initial value 1 is set both in the index n1 indicating the elements of U (the first target language sentence array) and in the index n2 indicating the elements of U2 (the second target language sentence array) (14109), while the initial value 0 is set in p2 (length in x direction of the target language sentence display region) and the initial value −1 in q2 (length in y direction of the target language sentence display region) (14110).

14111 to 14117 are processings to search for a position at which C/R-L/F (carriage return and line feed) can be inserted as forward as possible in U (n), . . . , U (n+pm−1). First, min (n+pm, N+1) is set in nw (target language sentence array U's second index) as the initial value (14111). Then, it is checked whether or not U (nw) is blank (14112). If it is blank, then C/R-L/F can be inserted is possible to the point. So, the processing 14118 is executed. If it is not blank, then 1 is subtracted from nw (14113), and the processing 14112 is executed again. When nw is smaller than n (14114), however, it means that the current enlargement R (k) is insufficient. In such a case, an attempt is made to increase the enlargement ratio in x direction. In other words, 1 is added to k (14116), and the processing 14108 is executed again. When k=K (14115), however, it is impossible to increase the length in x direction of the target language sentence display region any longer. So, n+pm is set in nw (14117) so that U (n), . . . , U (n+pm−1) may be displayed on a line. After this, the processing 14118 is executed.

14118 to 14127 are processings to set a line of data in U2 (the second target language sentence array) and to update p2 and q2 (lengths in x and y directions of the target language sentence display region). First, it is checked whether or not (nw−n) is larger than p2 (14118). When (nw−n) is larger than p2, p2 is updated with (nw−n) (14119). Then, 2 is added to q2 (14120). After this, characters are copied from U (the first target language sentence array) to U2 (the second target language sentence array). In other words, U(n) is written in U2 (n2) (14121), and 1 is added to both n and n2 (14122). When n<nw (14123), the processing 14121 is executed again. When n=nw (14123), a C/R-L/F code is written in U (n2) (14124) and 1 is added to n2 (14125). When U (nw) is blank (14126), 1 is added to n (14127).

When a line of data has been set in U2 (the second target language sentence array), it is checked whether or not n≦N (14128). When n≦N, the processing 14111 is executed again to search the next position to insert C/R-L/F. When n>N, q2 is compared with q1 (14129).

When q2≦q1, that is, when the length in y direction of the target language sentence display region is less than or equal to that of the source language sentence display region, p2 and q2 are output as the i-th target language sentence display region data (14130) and U2 (1), . . . , U2 (n2−1) is output as the local placement of the i-th target language sentence data (14131). After this, 1 is added to i (14132), and the processing 14102 is executed again to process the next target language sentence. However, when i becomes larger than IE (max sentence number) (14133), the processing is ended. When q2>q1 (14129), that is, when the length in y direction of the target language sentence display region is more than that of the source language sentence display region, an attempt is made to increase the enlargement ratio in x direction. In other words, it is checked whether or not k<K (14134), and the processing 14116 is executed. When not k<K (14134), it is impossible to increase the enlargement ratio in x direction any longer. Thus, the processing 14130 is executed to output the i-th target language sentence display region data and the local placement of the i-th target language sentence data.

FIGS. 22(*b*) and(*c*) show the target language sentence display region data 26 and the local placement of the target language sentence data 27 determined for the target language sentence data shown in FIG. 22(*a*) through the processings mentioned above in reference to the source language sentence display region data shown in FIG. 12(*d*). FIG. 22(*d*) shows the display image of local placement of the target language sentence.

(5) Figure drawing step 142

The vertexes of each target language sentence display region in the target figure are represented by coordinate variables in the figure conditions extraction step 123. On the other hand, the lowest limits of the lengths in both x and y directions of each target language sentence display region are determined in the local placement of target language sentence step 141. In the figure drawing step 142, the condition formulae related to the size of each target language sentence display region are generated, they are added to the condition formulae generated in the figure conditions extraction step 123, and the values of coordinate variables satisfying the condition formulae are found. The determined coordinates, except those for the target language sentence display regions, are output as the drawing data 321 of the target figure.

The generation of condition formulae related to the target language sentence display regions will be explained below using the flow chart shown in FIG. 23. First, the initial value IS (the first sentence number) is set in the sentence number indexes i and j (14201). When the i-th target language sentence display region data does not exist (14202), the processing 14206 is executed to update the value of i. When the i-th region data exists (14202), it is read and the lengths in both x and y directions are set in p and q respectively (14203). Then, condition formulae X (j+1)−X (j)>p, and Y (j+3)−Y (j+2)>q is generated (14204). This condition formula indicates that the i-th target language sentence is contained in the rectangle connecting four points (X (j), Y (j)), (X (j+2), Y (j+2)), (X (j+4), Y (j+4)), and (X (j+6), Y (j+6)). After this, 8 is added to j (14205) and 1 is added to i (14206). When i is not larger than IE (the last sentence number) (14207), the processing 14202 is executed again. When i is larger than IE (14207), the processing is ended.

Figures 23, 24:
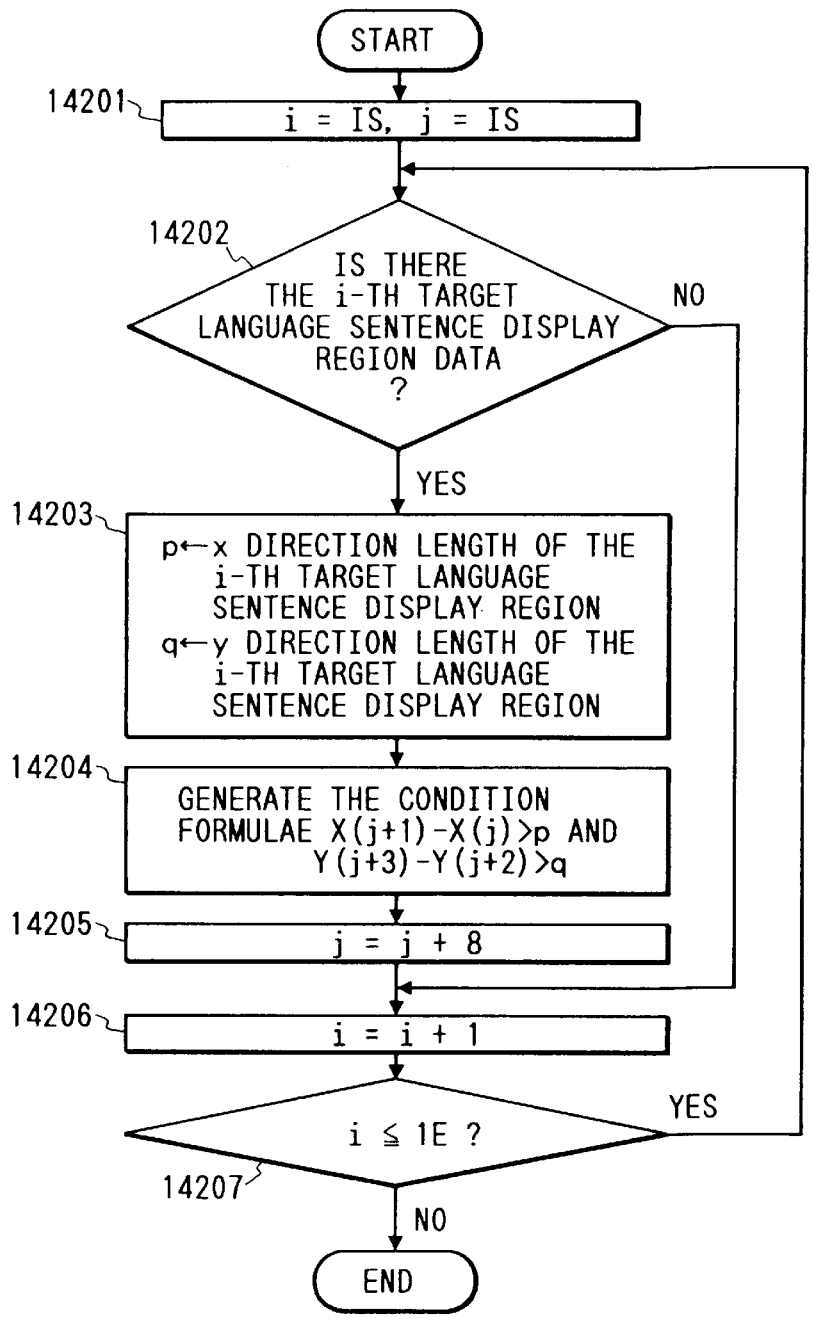
FIG. 23 shows the flow chart of the condition formula generation in relation to target language sentence display regions.
FIG. 24 shows an example of the condition formulae in relation to target language sentence display regions.
Figure 25:
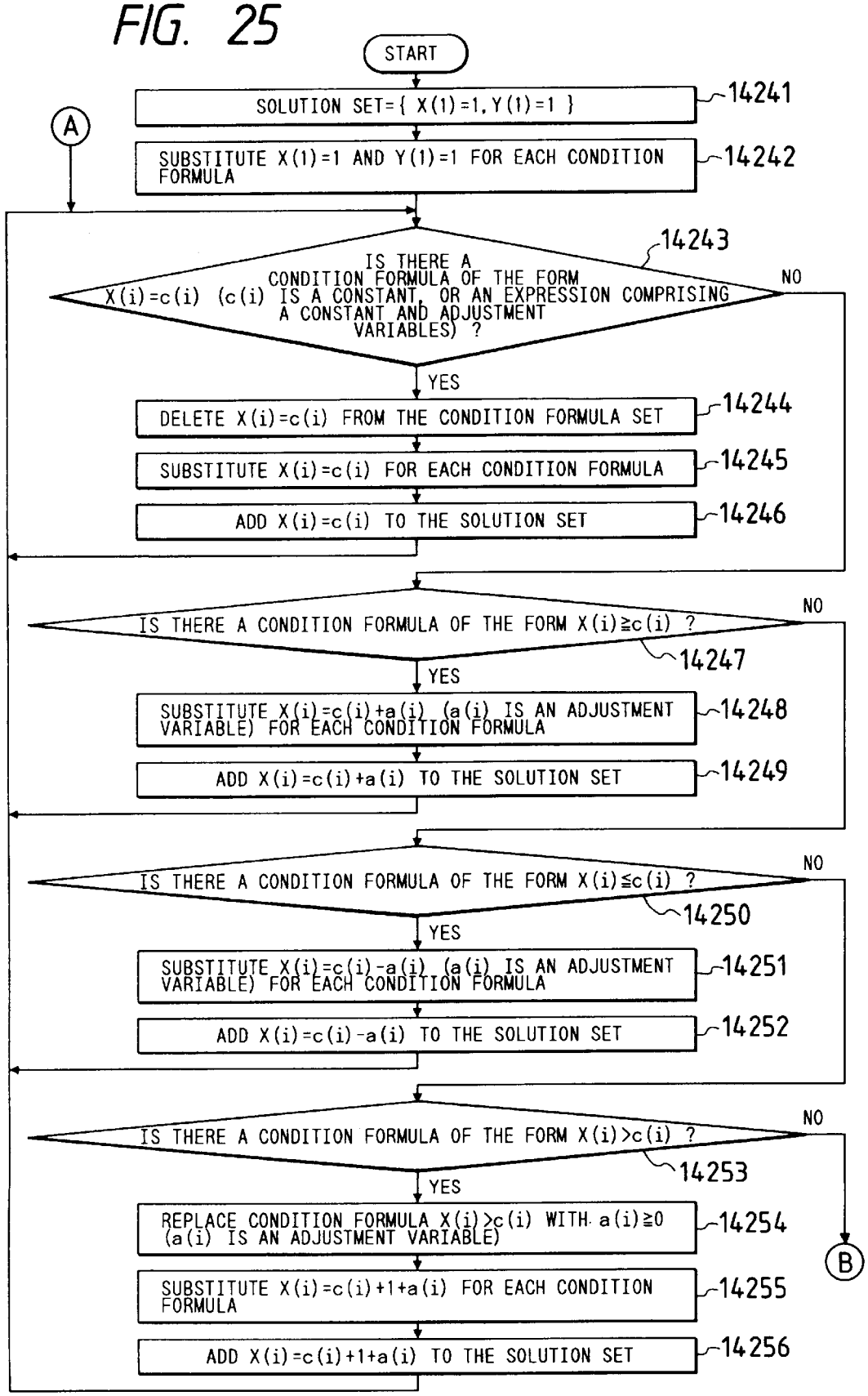
FIG. 25 shows part of the flow chart for the coordinates variable value determination.
Figure 26:
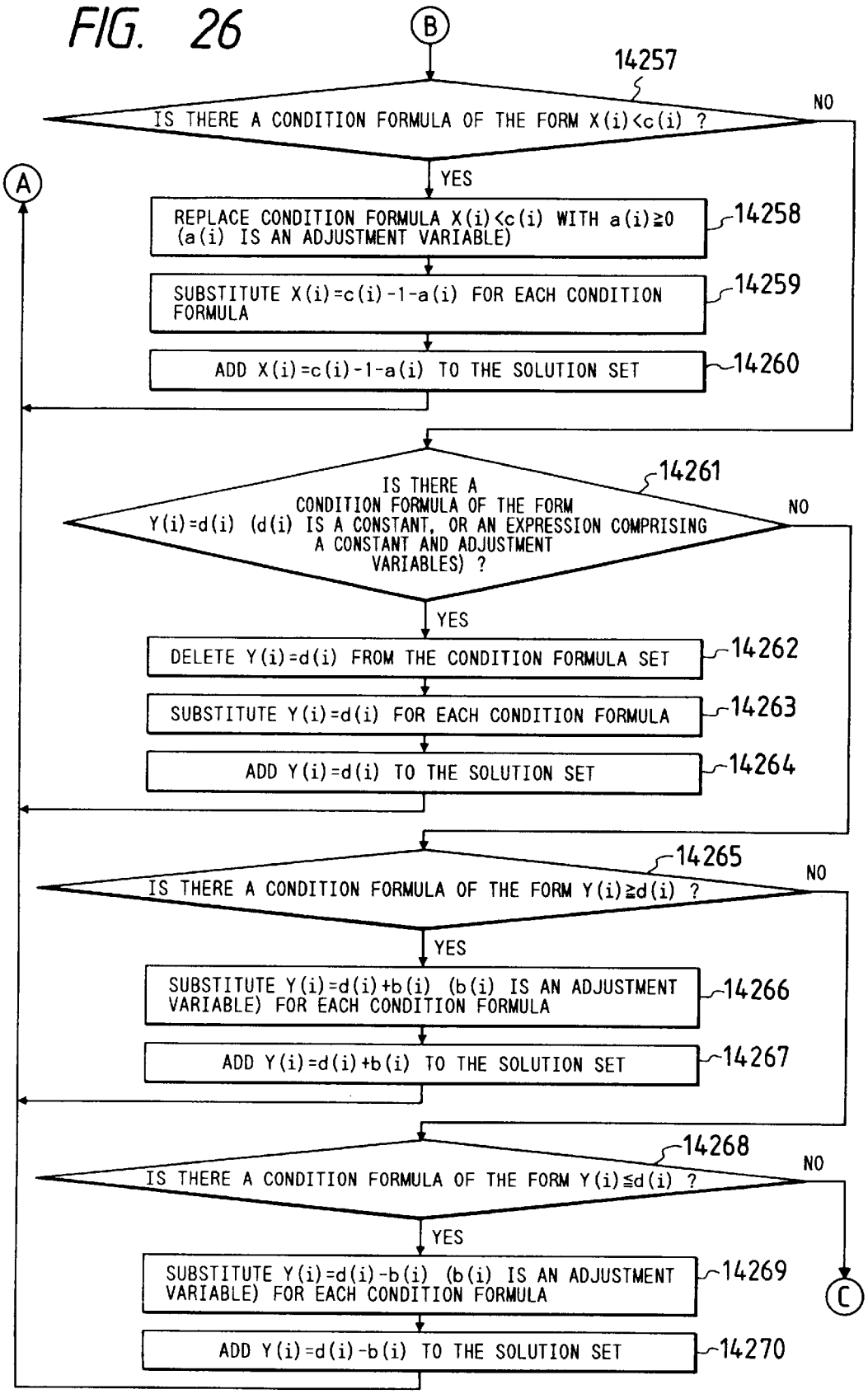
FIG. 26 shows part of the flow chart for the coordinates variable value determination.
Figure 27:
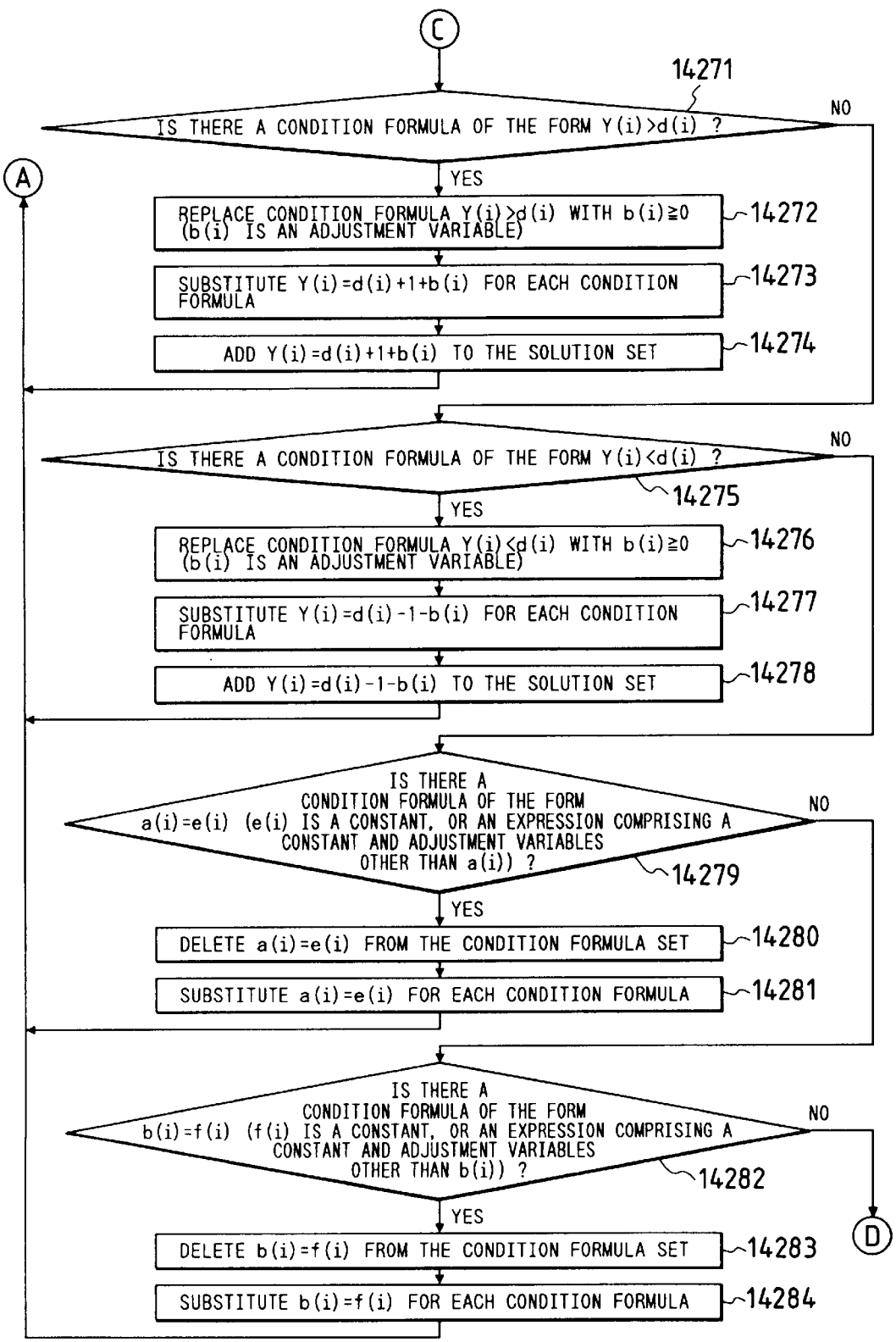
FIG. 27 shows part of the flow chart for the coordinates variable value determination.
Figure 28:
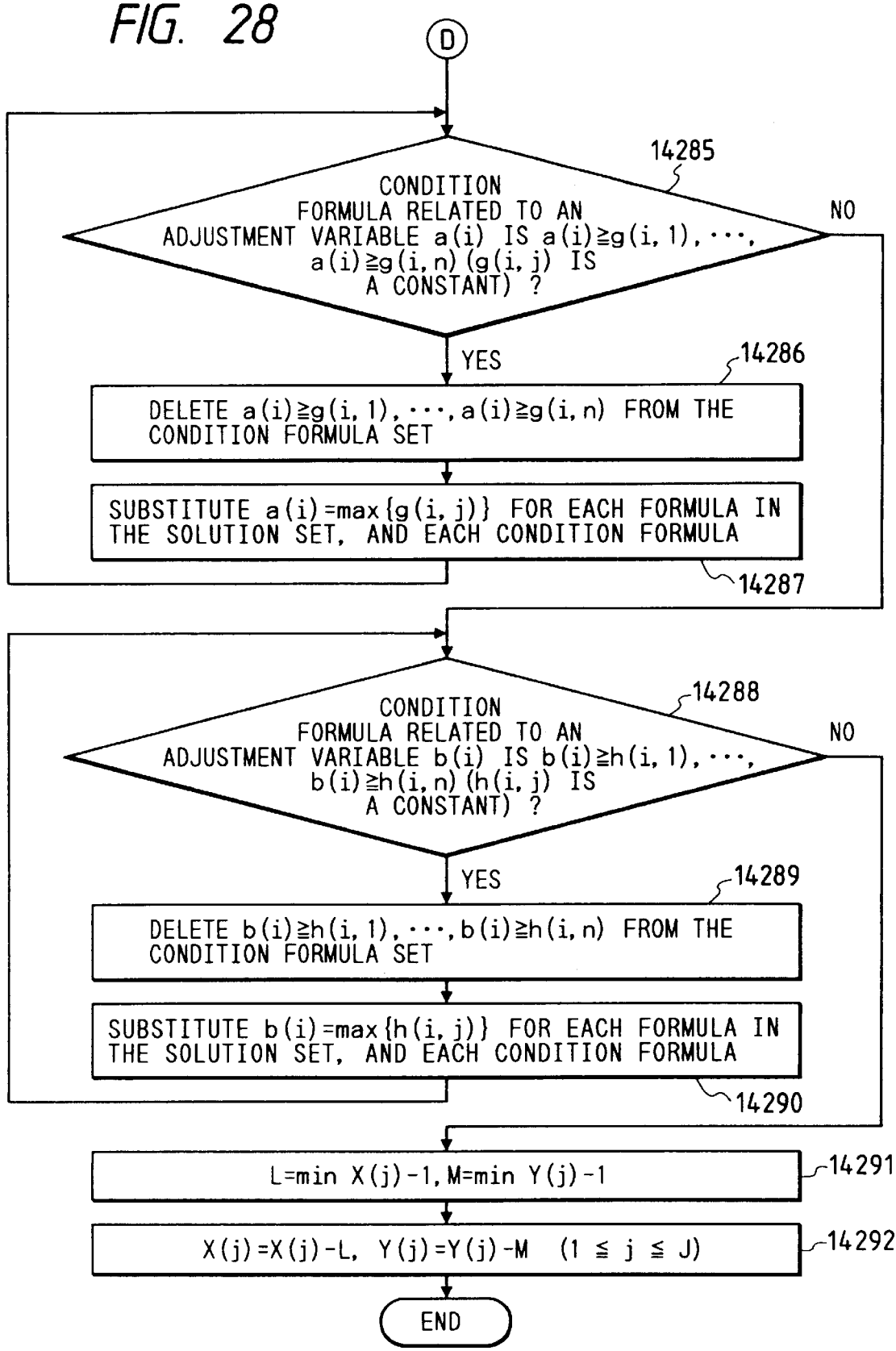
FIG. 28 shows part of the flow chart for the coordinates variable value determination.

FIG. 24 shows a set of condition formulae generated from the target language sentence display region data shown in FIG. 22(*b*) through the processings mentioned above.

The processing to determine coordinate values satisfying the condition formulae determines coordinates one by one sequentially by pursuing the connection of the line segments starting at a point. It would be appropriate to explain here adjustment variables to be introduced in the subsequent processings. An adjustment variable is used for each condition formula of inequality. Usually, values of variables satisfying a condition formula of inequality cannot be uniquely determined. However, inequality should be formed as close as to equality to obtain a compact drawing. So, a non-negative adjustment variable is introduced to each inequality formula so that it may be assumed as an equality formula. The adjustment variables are determined as values as small as possible in the final step of adjusting the values of the variables.

The processing to determine coordinate values satisfying the condition formulae will be explained below using the flow charts shown in FIGS. 25 through 28. First, the initial value (X (1)=1, Y (1)=1) is set in the solution set (14241), and X (1)=1 and Y (1)=1 are substituted for each condition formula (14242). After this, it is checked whether or not there is a condition formula of the form X (i)=c (i) (c (i) is a constant or an expression comprising a constant and adjustment variables) in the condition formula set (14243). If not, the processing 14247 is executed. If there is, the condition X (i)=c (i) is deleted from the condition formula set (14244) and X (i)=c (i) is substituted for each condition formula (14245). In addition, X (i)=c (i) is added to the solution set (14246) and the processing 14243 is executed again.

In 14247, it is checked whether or not there is a condition formula of the form X (i)$\geq$c (i) in the condition formula set. If not, the processing 14250 is executed. If there is, an adjustment variable a(i) is introduced and X (i)=c (i)+a (i) is substituted for each condition formula (14248). Then, X (i)=c (i)+a (i) is added to the solution set (14249) and the processing 14243 is executed again.

In 14250, it is checked whether or not there is a condition formula of the form X (i)$\leq$c (i) in the condition formula set. If not, the processing 14253 is executed. If there is, an adjustment variable a (i) is introduced and X (i)=c (i)-a (i) is substituted for each condition formula (14251). Then, X (i)=c (i)-a (i) is added to the solution set (14252) and the processing 14243 is executed again.

In 14253, it is checked whether or not there is a condition formula of the form x (i)>c (i) in the condition formula set. If not, the processing 14257 is executed. If there is, an adjustment variable a(i) is introduced and the condition formula X (i)>c (i) is replaced with a (i)$\geq$0 (14254). Then, X (i)=c (i)+1+a(i) is substituted for each condition formula (14255). After this, X (i)=c (i)+1+a (i) is added to the solution set (14256) and the processing 14243 is executed again.

In 14257, it is checked whether or not there is a condition formula of the form X (i)<c(i) in the condition formula set. If not, the processing 14261 is executed. If there is, an adjustment variable a(i) is introduced and the condition formula X (i)<c(i) is replaced with a (i)>0 (14258). Then, X (i)=c (i)-1-a (i) is substituted for each condition formula (14259). After this, X (i)=c (i)-1-a (i) is added to the solution set (14260). 14261 to 14278 are completely the same as 14243 to 14260. While 14243 to 14260 are processings for condition formulae related to a variable X (i), 14261 to 14276 are processings for condition formulae related to a variable Y (i).

In 14279, it is checked whether or not there is a condition formula of the form a (i)=e (i) (e (i) is a constant or an expression comprising a constant and adjustment constants other than a (i)) in the condition formula set. If not, the processing 14282 is executed. If there is, a (i)=e (i) is deleted from the condition formula set (14280). Then, a (i)=e (i) is substituted for each condition formula (14281) and the processing 14243 is executed again.

In 14282, it is checked whether or not there is a condition formula of the form b (i)=f (i) (f (i) is a constant or an expression comprising a constant and adjustment constants other than b (i)) in the condition formula set. If not, the processing 14285 is executed. If there is, b (i)=f (i) is deleted from the condition formulas set (14283). Then, b (i)=f (i) is substituted for each condition formula (14284) and the processing 14243 is executed again.

14285 through 14290 determines the values of the adjustment variables. First, it is checked whether or not the condition formulae related to an adjustment variable a (i) are a (i)$\geq$g (i,1), . . . , a (i)>g (i,n) (g (i, j) is a constant) (14285). If there is such an adjustment variable a (i), a (i)$\geq$g (i, 1), . . . , a (i)$\geq$g (i, n) are deleted from the condition formula set (14286). Then, a (i)=max (g (i, j)) is substituted for each formulae in the solution set and each condition formula (14287), and the processing 14285 is executed again.

In the same way, it is checked whether or not the condition formulae related to an adjustment variable b (i) are b (i)$\geq$h (i, 1), . . . , b (i)$\geq$h (i, n) (h (i, j) is a constant) (14288). If there is such an adjustment variable b (i), b (i)$\geq$h (i, 1), . . . , b (i)$\geq$h (i,n) are deleted from the condition formula set (14289). Then, b (i)=max (h (i, j)) is substituted for both each formula in the solutions set and for each condition formula (14290), and the processing 14288 is executed again.

Finally, 14291 and 14292 shift the drawing so that both the minimum value of X (i) and the minimum value of Y (i) may become 1. In other words, (min X (j)-1) is set in L and (min Y (j)-1) in M (14191). Then, L is subtracted from each X (j) and M from each Y (j) (14292).

FIG. 29 shows the coordinate arrays obtained from the source figure data shown in FIG. 3 through the processings mentioned above. FIG. 4(*a*) shows the drawing data corresponding to it.

(6) Target text composition step 143

The absolute position of each target language sentence display region in the target figure is determined in the figure drawing step 142. So, each target language sentence is placed in a 2-dimensional text array E (x, y). Then, the placement of all the characters in the text array E is converted to a 1-dimensional character string. This character string is output as the text data 322 of the target figure data 32.

Figure 30:
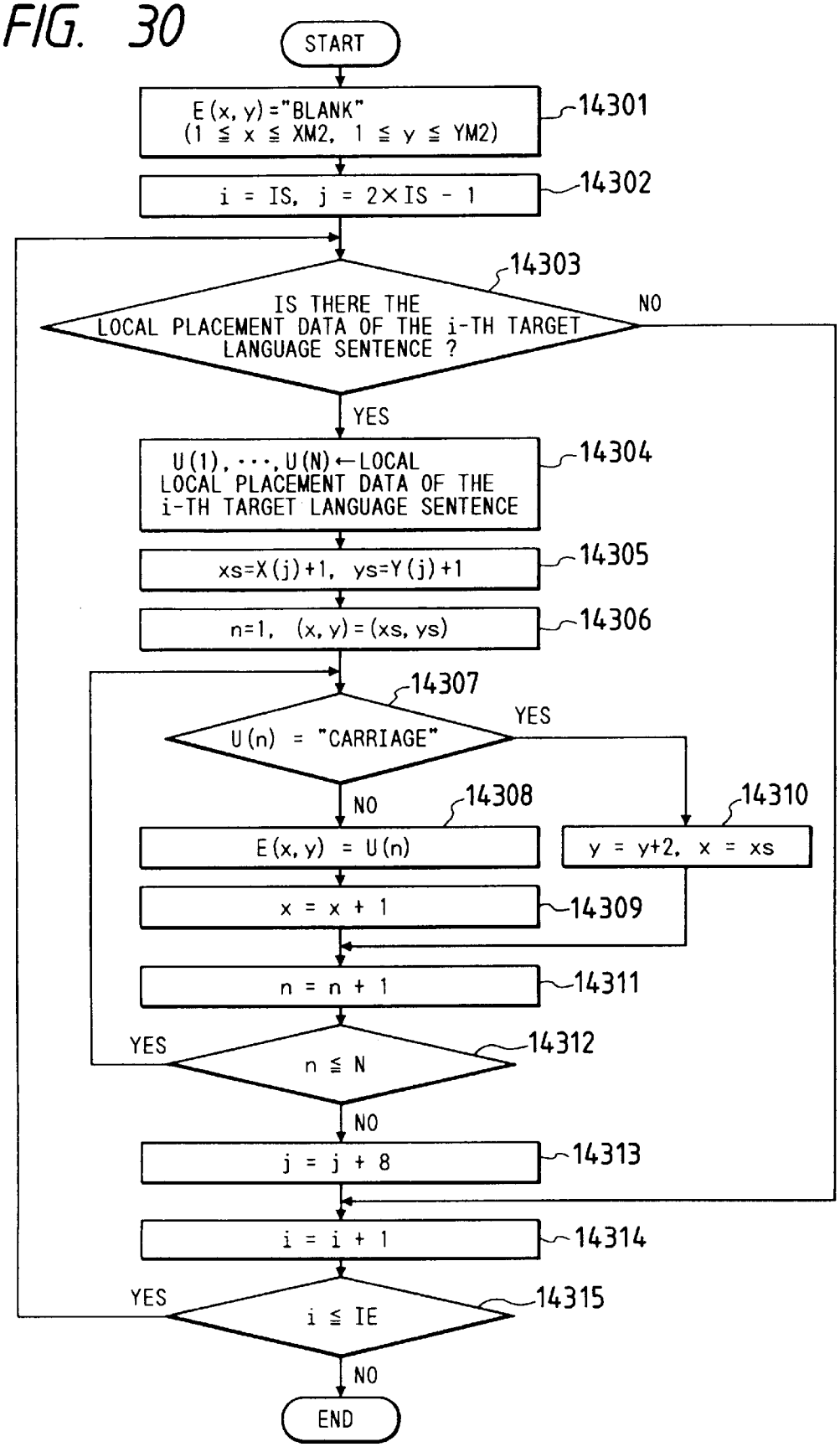
FIG. 30 shows the flow chart of the placement of target sentences in a text array.

The details of the placement of the target language sentences in a text array will be explained below using the flow chart shown in FIG. 30. First, all the elements in a text array E (x, y) (1$\leq$x$\leq$XM2, 1$\leq$y$\leq$YM2) are blanked (14301). The initial value IS (the first sentence number) is set in the sentence number index i and the initial value 2·IS-1 is set in the coordinate array index j (14302). When the local placement data of the i-th target language sentence is found (14303), it is read and set in an array U (14304). When the data is not found (14303), the processing 14314 is executed. When the length of the target language sentence is N, characters are written in U (1), . . . , U (N). Then, X (j) and Y (j) are read from the coordinate arrays, and X (j)+1and Y (j)+1 are set in xs and ys respectively (14305). The initial value 1 is set in the index n indicating the elements of the array U, and the initial value (xs, ys) in the index (x, y) indicating the elements of the text array E (14306). When U (n) is not a C/R-L/F code (14307), U (n) is written in E (x, y) (14308) and 1 is added to x (14309). When U(n) is a C/R-L/F code (14307), (x, y) is updated so that it may indicate the start of the next row in the target language sentence display region. That is, 2 is added to y and xs is set in x (14310). Then, 1 is added to n (14311). When n≦N (14312), the processing 14307 is executed again. When n>N (14312), 8 is added to j (14312). After this, 1 is added to i (14314). When i is not larger than IE (the last sentence number) (14315), the processing 14303 is executed again to process the next target language sentence. When i is larger than IE (14315), the processing is ended.

FIG. 32(*a*) shows the text array obtained from the local placement data of target language sentence shown in FIG. 22(*c*) and the coordinate arrays shown in FIG. 29 through the processing mentioned above.

The simplest method to compose a target text data from the text array data is to arrange the rows from up to down and the characters from left to right for each row. This method is used basically here. However, when there exists a string of blanks on the right side of a row, the string of blanks is replaced with a C/R-L/F code in order to shorten the target text data.

Figure 31:
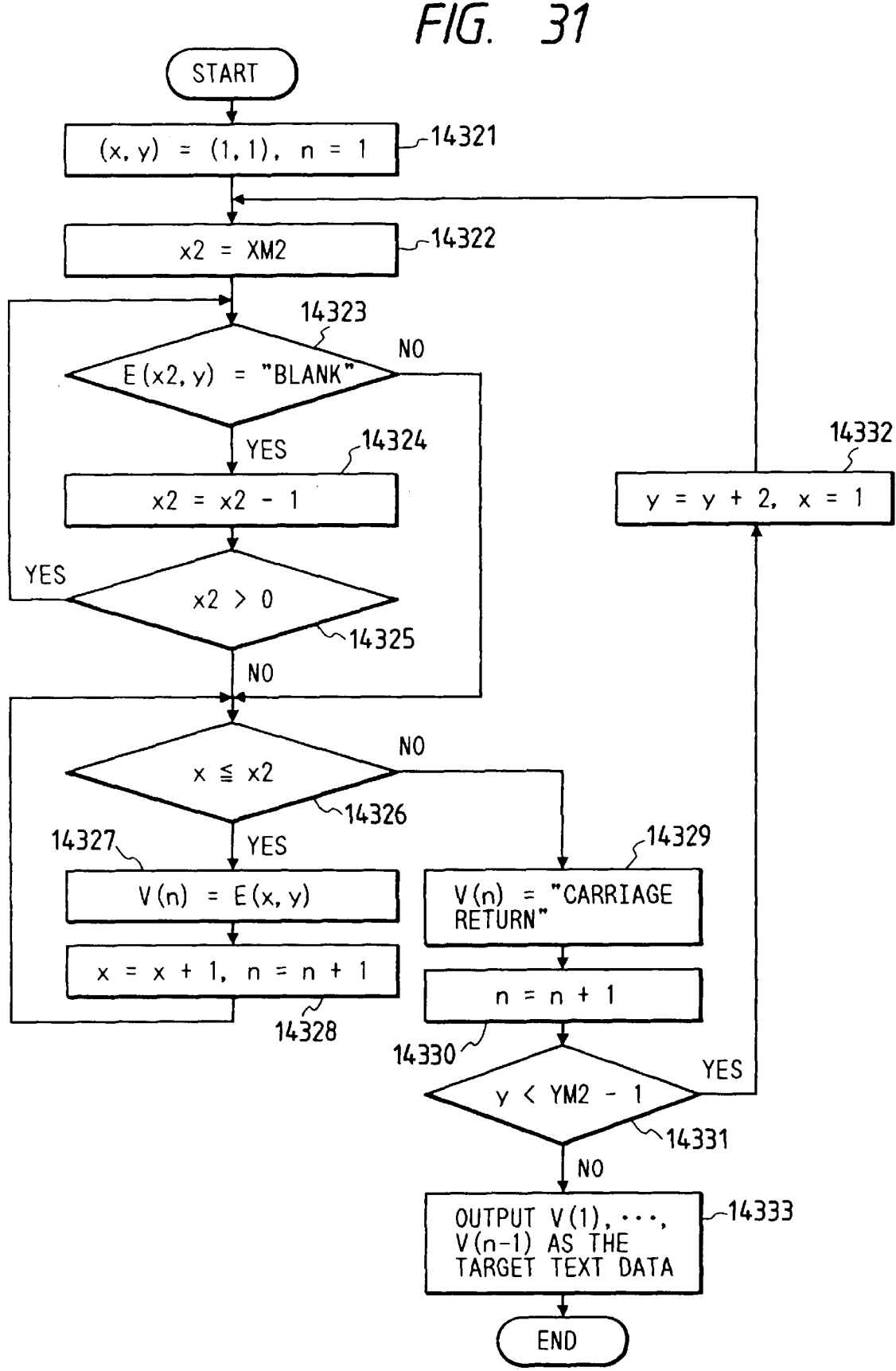
FIG. 31 shows the flow chart of target text composition from a text array.

The details of the processing to compose a target text data from the text array data will be explained below using the flow chart shown in FIG. 31. In the flow chart, E (x, y)(1≦x≦XM2, 1≦y≦YM2) is a text array and V (n) is a 1-dimensional array to store the target text data.

First, the initial value (1, 1) is set in the index (x, y) indicating the elements of the text array E and the initial value 1 in the index n indicating the target text data array V (14321).

14322 through 14325 recognize the existence of a string of blanks on the right side of a row. The initial value XM2 is set in the variable x2 indicating the columns in the text array (14322). It is checked whether or not E (x2, y) is blank (14323). When it is not blank (14323), the processing 14326 is executed. When it is blank, 1 is subtracted from x2 (14324). When x2>0 (14325), the processing 14323 is executed again. When x2=0 (14325), the processing 14326 is executed.

14326 through 14330 set the y-th row data of the text array E in the target text data array V. It is checked whether or not x≦x2 (14326). When x≦x2, E(x, y) is written in V (n) (14327), 1 is added to both x and n (14328), then the processing 14326 is executed again. When x<x2, a C/R-L/F code is written in V (n) (14329) and 1 is added to n (14330).

After the y-th row data is set in V, if y<YM2-1 (14331), (x, y) is updated so that it may indicate the leftmost element in the next row (14332), and the processing 14322 is executed again. If y≧YM2-1 (14331), V (1), . . . , V (n-1) are output as the target text data 322 (14333) and the processing is ended.

FIG. 32(*b*) shows the target text data obtained from the text array shown in FIG. 32(*a*) through the processings mentioned above. The same data is also shown in FIG. 4(*b*).

Embodiment 2

A figure creating system, which is the second embodiment of the present invention, will be explained below.

Figure 33:
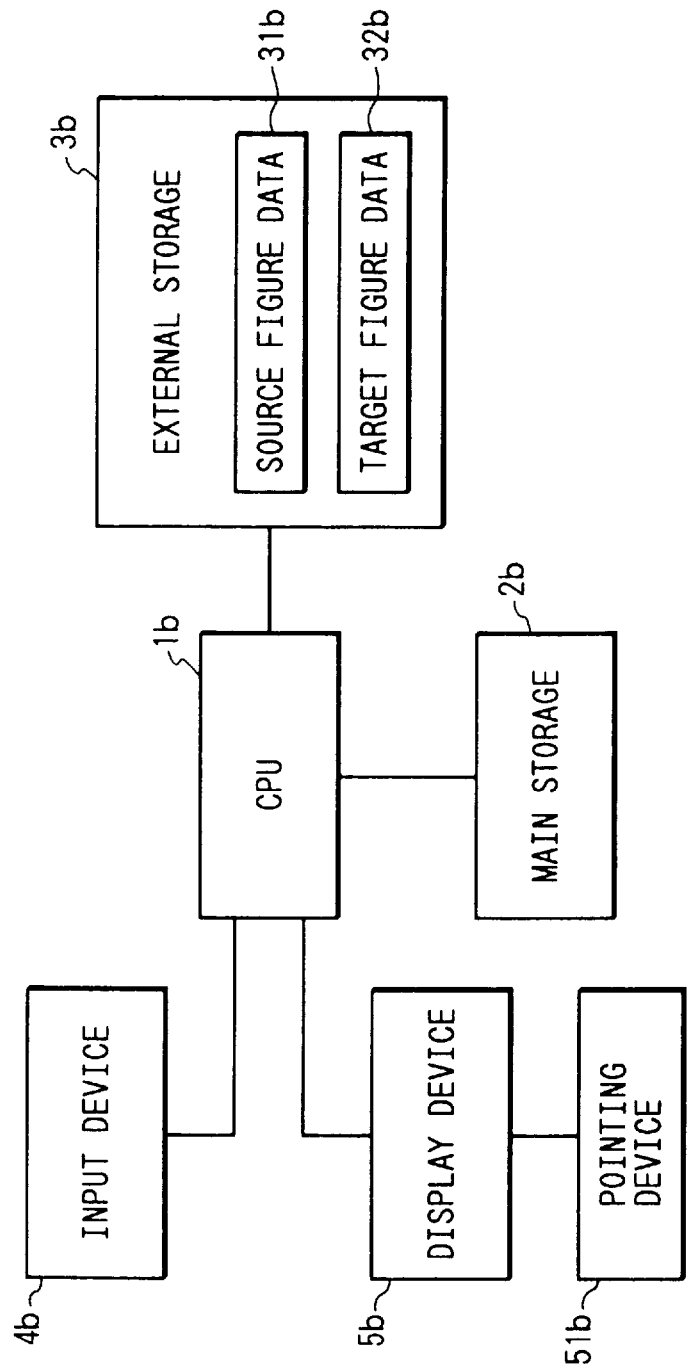
FIG. 33 shows the configuration of the figure creating system in the second embodiment of this invention.

The figure creating system, as shown in FIG. 33, consists of CPU 1*b*, main storage 2*b*, external storage 3*b*, input device 4*b*, display device 5*b*, and pointing device 51*b*. The external storage 3*b* is used to store source figure data 31*b* and target figure data 32*b*. The CPU 1*b* executes the processings shown in FIG. 34 to realize the functions of the figure creating system.

Figure 34:
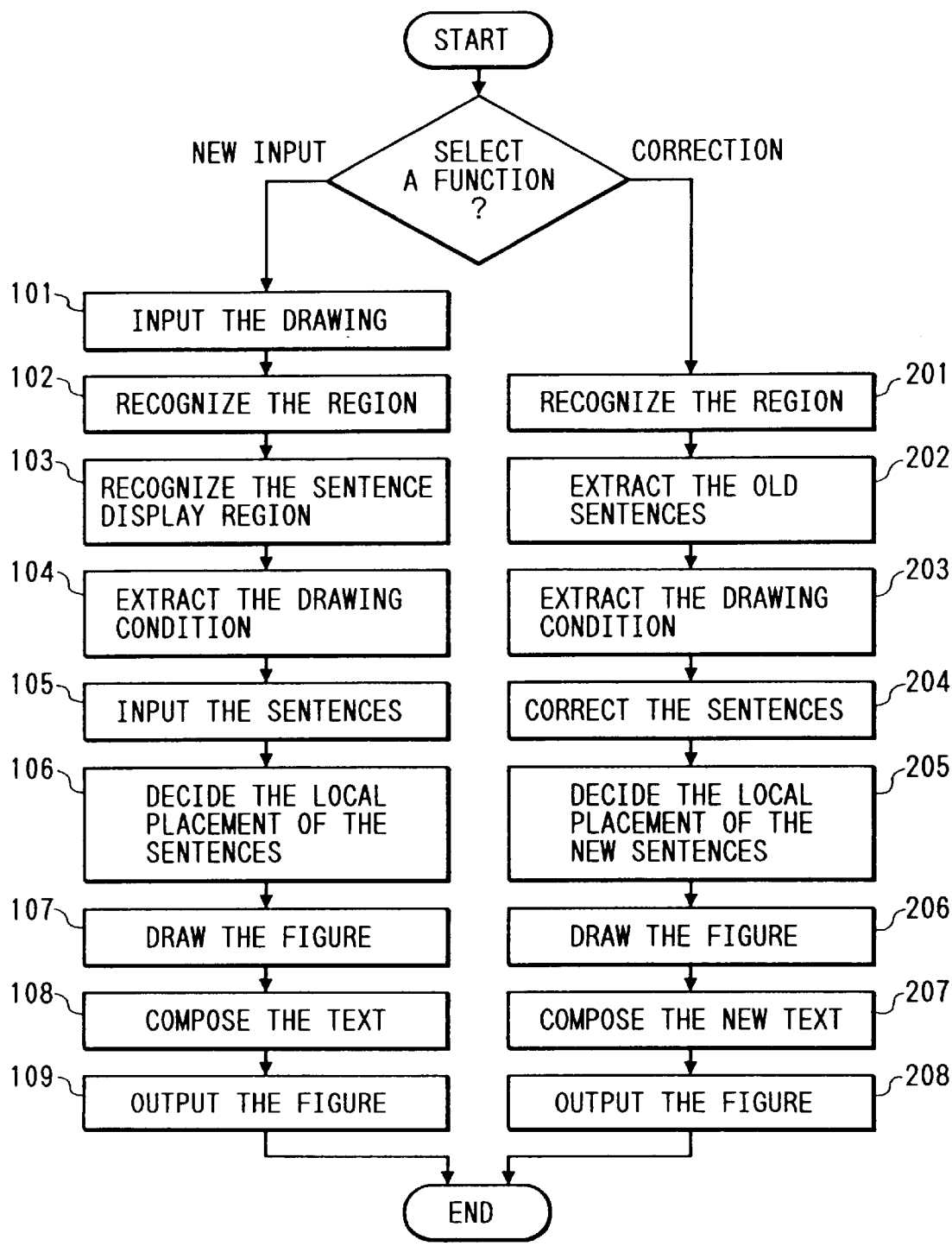
FIG. 34 shows the processing steps of the figure creating system.

As shown in FIG. 34, the user of the figure creating system can select a function from {NEW INPUT} and {CORRECTION}. When {NEW} is selected, the drawing input step 101 reads the drawing data entered by the user through the input device 4*b*, and stored it in the external storage 3*b* as source figure data 31*b*. The figure input step 101 consists of word processor's drawing input functions, which are realized by well-known technologies. In the figure creating system in this embodiment, the user enters only the shapes of drawing elements. The user does not have to calculate the size of each region based on the length of the sentence to be placed in the region. However, in this embodiment, the sentence display regions are limited only to rectangles having horizontal sides.

When a drawing is entered, the region recognition step 102, the sentence display region recognition step 103, and the drawing conditions extraction step 104 are executed in order. The region recognition step 102 is completely the same as the region recognition step 121 in the figure translation system in the first embodiment. That is, drawing data is placed in a region array, and elements comprising each region are labelled. The sentence display region recognition step 103 is a substitute for the source language sentence extraction step 122 in the figure translation system in the first embodiment. Unlike in the figure translation system, there is no sentence data to be extracted. So, each rectangular region having horizontal sides created with the drawing data is extracted and it is regarded as a source sentence display region. The source sentence data is kept blank. The details of the sentence display region recognition step 103 will be explained later. The drawing conditions extraction step 104 is completely the same as the figure conditions extraction step 123 in the figure translation system. That is, the characteristics that should be preserved even when the regions are enlarged/shrinked to place texts in them are extracted from the drawing data and represented as relational formulae for coordinate variables.

The sentence input step 105 comes after the drawing conditions extraction step 104. The step 105 consists of word processor's character input functions, which can be realized by well-known technologies. This embodiment is characterized by entry of sentences corresponding to the regions. The display device 5*b* has a drawing display area and a sentence display/input area. During the sentence input step 105, the drawing entered in the drawing input step 101 are displayed in the drawing display area of the display device 5*b*. When the user specifies a point in the region using the pointing device 51*b*, the region array is referenced from the coordinates of the specified point to determine the region number of the specified region. The region number serves as a sentence number. So, the source sentence data is searched according to the specified sentence number and displayed in the sentence display/input area of the display device 5*b*. Since the source sentence data is actually blank, the sentence display/input area becomes blank. The user enters a sentence to that blank area. The source sentence data is updated with the entered sentence. The processing mentioned above is repeated to enter sentences to be placed in the target figure one after another. When the sentence entry ends, the source sentence data is copied into the target sentence data.

After the sentence input step 105, the local placement of sentences step 106, the figure drawing step 107, and the text composition step 108 are executed in order. The local placement of sentences step 106 determines the size of each target sentence display region and places the target sentence in the target sentence display region. Basically, the processing is the same as that of the local placement of target language sentence step 141 of the figure translation system. However, the target sentence is in Japanese in the figure creating system in this embodiment, while the target sentence is in English in the figure translation system. So, details between the systems differ naturally. The details of the local placement of sentences step 106 will be explained later. The figure drawing step 107 is completely the same as the figure drawing step 142 of the figure translation system. That is, the condition formulae related to the size of each target sentence display region determined in the local placement of sentences step 106 are generated, they are added to the condition formulae obtained in the drawing conditions extraction step 104 and the values of coordinate variables satisfying those condition formulae are found. The determined coordinates, except those for the target sentence display regions, are output to the external storage 3b as the drawing data of the target FIG. 32b. The text composition step 108 is completely the same as the target text composition step 143 of the figure translation system. That is, each target sentence is placed in a 2-dimensional array according to the coordinates of the sentence display regions determined in the figure drawing step 107 and the local placement data of target sentences obtained in the local placement of sentences step 106. Then, the placement of the characters in the whole array is converted to a 1-dimensional character string. This character string is output to the external storage 3b as the text data of the target FIG. 32b.

Finally the figure output step 109 is executed. In this step, a display image is created from the target figure data 32b and output to the display device 5b. The figure output step 109 consists of so-called word processor's output functions, which can also be realized by well-known technologies.

When the user selects {CORRECTION} from the function menu of the figure creating system, he/she also specifies the figure to correct. The specified figure data is assumed as source figure data 31b. When {CORRECTION} is selected, the region recognition step 201, the source sentence extraction step 202, and the drawing conditions extraction step 203 are executed in order. The region recognition step 201 is completely the same as the region recognition step 102 for {NEW INPUT}. The source sentence extraction step 202 is completely the same as the source language sentence extraction step 122 in the figure translation system. That is, the text data of the source figure data 31b is placed in a text array, and the character data belonging to each region is collected to compose the source sentence data. The display region data for each source sentence is also created. The drawing conditions extraction step 203 is completely the same as the drawing conditions extraction step 104 for {NEW INPUT}.

After the drawing conditions extraction step 203, the sentence correction step 204 is executed. The sentence correction step 204 is completely the same as the sentence input step 105 for {NEW INPUT}. For {CORRECTION}, however, the source sentence already exists, so the source sentence is displayed in the sentence display/input area of the display device 5b when the user specifies a region using the pointing device 51b. The user corrects the displayed source sentence. The source sentence data is updated with the corrected sentence.

After the sentence correction step 204, the local placement of target sentences step 205, the figure drawing step 206, the target text composition step 207, and the figure output step 208 are executed in order. The local placement of target sentences step 205 is completely the same as the local placement of sentences step 106 for {NEW INPUT}, the figure drawing step 206 is completely the same as that 107 for {NEW INPUT}, the target text composition step 207 is completely the same as the text composition step 108 for {NEW INPUT}, and the figure output step 208 is completely the same as that 109 for {NEW INPUT}.

Figure 35:
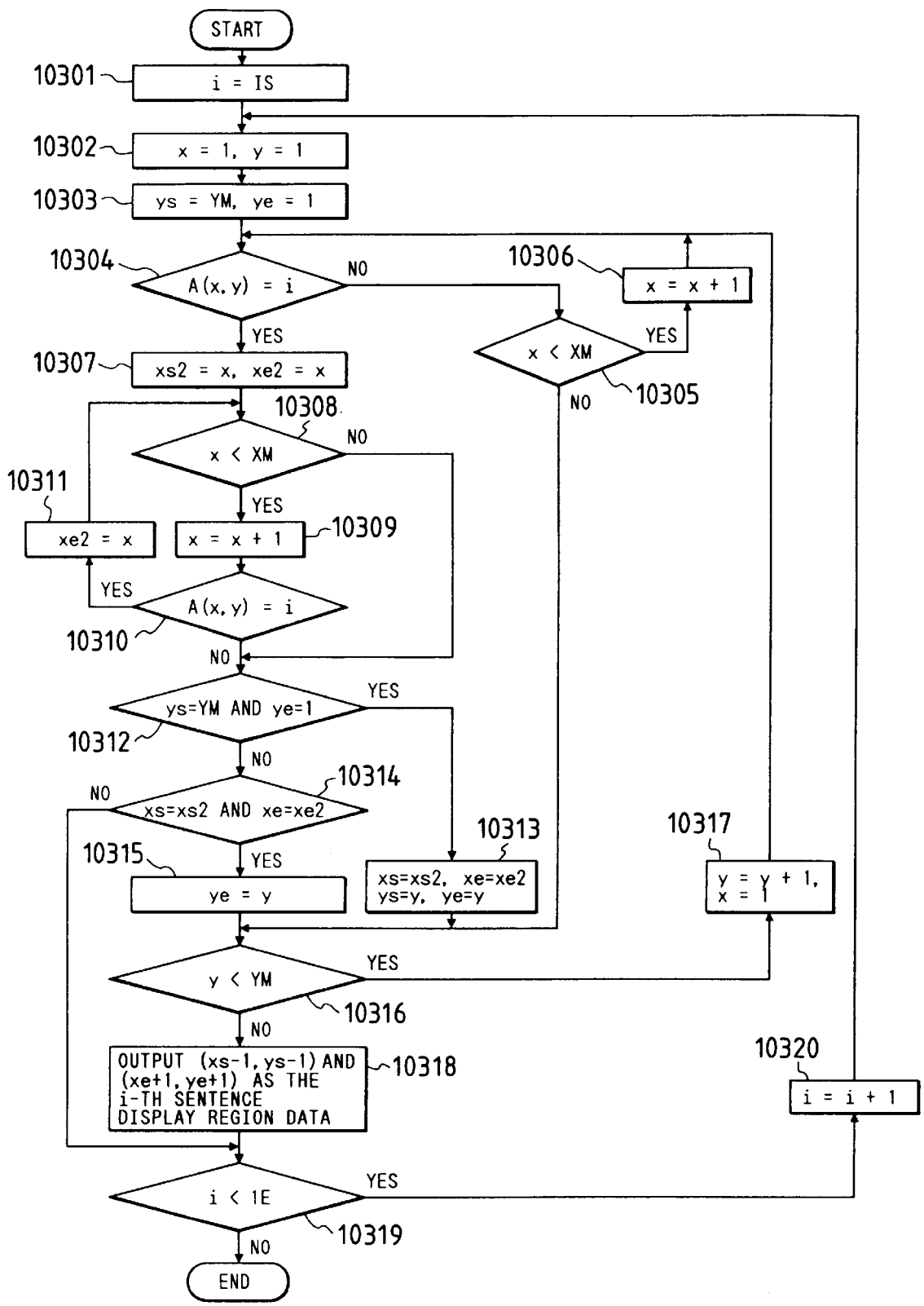
FIG. 35 shows the flow chart of sentence display region recognition.

The details of the sentence display region recognition step 103 will be explained below using FIG. 35. First, the initial value IS (the first region/sentence number) is set in the region number index i (10301), and the initial value (1, 1) in the index (x, y) indicating the elements of the region array A (10302). The initial value YM and 1 is set in ys and ye respectively ((xs, ys) and (xe, ye) are coordinate variables indicating the upper left point and lower right points of the sentence display region) (10303). After this, it is checked whether or not the value of the region array element A (x, y) is i (10304). When A (x, y) is not i, 1 is added to x (10306) and the processing 10304 is executed again. However, when x is not smaller than XM (10305), the processing 10316 is executed. When A (x, y) is i (10304), the value of x is set in both xs2 and xe2 (variables indicating the x coordinates of the leftmost and rightmost points of the sentence display region) (10307). Then, when x is smaller than XM (10308), 1 is added to x (10309) and it is checked whether or not A (x, y) is i (10310). When A (x, y) is i, xe2 is updated with the value of x (10311) and the processing 10308 is executed again. When A(x, y) is not i in 10310 or when x is not smaller than XM in 10308, the processing 10312 is executed.

In the stage of 10312, the values of xs2 and xe2 indicate the range of the y-th row elements included in the i-th sentence display region. So, when ys and ye are kept as YM and 1 (initial values) (10312), the values of xs2 and xe2 are set in xs and xe respectively and the value of y is set in both ys and ye (10313). When at least one of ys and ye differs from the initial value (10312), it is checked whether or not xs and xe match xs2 and xe2 respectively (10314).

When xs and xe match xs2 and xe2 respectively (10314), it means that the range of the y-th row elements included in the i-th sentence display region is the same as that of the previous row. So, ye is updated with the value of y (10315). After this, when y is not larger than YM (10316), (x, y) is updated so that it may indicate the leftmost element of the next row (10317) and the processing 10304 is executed again. When y reaches YM (10316), (xs−1, ys−1) and (xe+1, ye+1) are output as the i-th sentence display region data (10318), and the processing 10319 is executed. When xs does not match xs2 or xe does not match xe2 in 10314, it means that the i-th region is not a rectangle having horizontal sides. So, the processing 10319 is executed. In 10319, it is checked whether or not i is smaller than IE (the last region/sentence number). When i is smaller than IE, 1 is added to i (10320) and the processing 10302 is executed again for the next region. When i is not smaller than IE (10319), the processing is ended.

Figure 36:
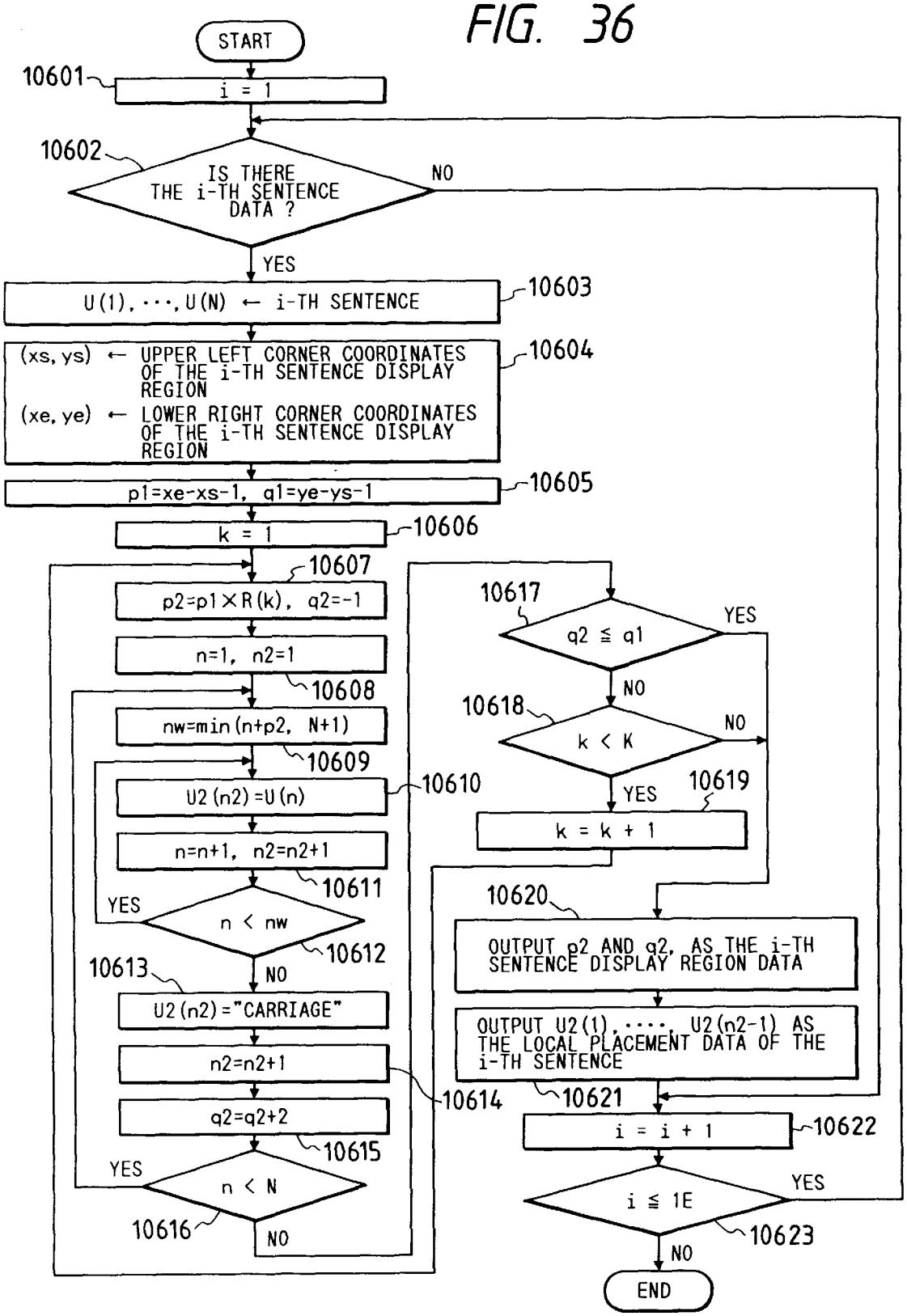
FIG. 36 shows the flow chart of the local placement of sentences.

The details of the local placement of sentences step 106 will be explained below using FIG. 36. The x direction enlargement ratio R (k) that appears in this step is the same as that in the local placement of target language sentence step 141 of the figure translation system. In the figure creating system in this embodiment, however, both source and target sentences are in Japanese. So, a value to be set in R (k) should be different from that for the figure translation system. For example, the value should be set as follows: R (1)=0.5, R (2)=0.75, R (3)=1.0, R (4)=1.25, R (5)=1.5, R (6)=2.0.

First, the initial value 1 is set in the sentence number index i (10601). Then, the i-th target sentence is read. When the i-th target sentence is found (10602), it is set in U (target sentence array) (10603). When the length of the target sentence is N, the characters are written in U (1) to U (N). After this, the i-th source sentence display region data is read and the coordinates of the upper left and lower right points of the region are set in (xs, ys) and (xe, ye) respectively (10604). Then, the length of the source sentence display region in x direction xe–xs–1 and that in y direction ye–ys–1 are calculated and are set in p1 and q1 respectively (10605). Then, the processing 10606 is executed. When the i-th target sentence is not found (10602), the processing 10622 is executed to update the value of i.

10606 through 10619 convert target sentences to target sentences with C/R-L F code. First, the initial value 1 is set in the index k indicating the x direction enlargement ratios (10606). Then, p1 (the length in x direction of the source sentence display region) x R (k) is set in p2 (the length in x direction of the target sentence display region). The initial value –1 is set in q2 (the length in y direction of the target sentence display region) (10607). Then, the initial value 1 is set both in the index n indicating the elements of the first target sentence array U and in the index n2 indicating the second target sentence array U2 (10608). The minimum value of n+p2 and N+1 is set in nw indicating the carriage return and line feed position (10609). After this, character data is copied from the first target sentence array U into the second target sentence array U2, assuming that carriage return and line feed is to be made between U (nw–1) and U (nw). That is, the processing to copy U (n) into U2 (n2) (10610) is repeated while 1 is added to both n and n2 until n reaches nw (10612). After this, a C/R-L/F code is written in U2 (n2) (10613) and 1 is added to n2 (10614). In addition, 2 is added to q2 (10615), and n is compared with N (10616). When n<N, the processing 10609 is executed again. When n=N, q2 (the length in x direction of the target sentence display region) is compared with q1 (that of the source sentence display region) (10617). When q2≦q1, the processing 10620 is executed to output the target sentence display region data and the local placement data of target sentences. When q2>q1, 1 is added to k to attempt to increase the x direction enlargement ratio (10619), and the processing 10607 is executed again. When k is equal to k (the maximum value for the index to the x direction enlargement ratios) (10618), the processing 10620 is executed to output the target sentence display region data and the local placement data of target sentences. In 10620, p2 and q2 are output as the i-th target sentence display region data. Then, U2 (1), . . . , U2 (n2–1) are output as the local placement data of the i-th target sentence (10621). After this, 1 is added to i (10622) and the processing 10602 is executed again for the next target sentence. When i is larger than IE (the last region/sentence number) (10623), the processing is ended.

Figures 37A, 37B, 37C:
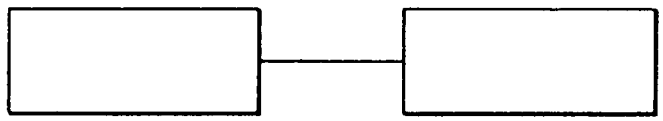
FIGS. 37(a), 37(b), and 37(c) show an example of creating a new figure using the figure creating system.
Figures 38A, 38B, 38C:
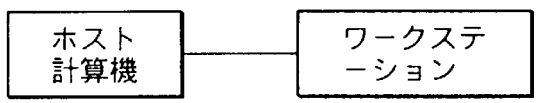
FIGS. 38(a), 38(b) and 38(c) show an example of creating a new figure using the figure creating system.

FIGS. 37 and 38 show an example of figure creation by the figure creating system shown in this embodiment. FIG. 37(*a*) shows the display image of the entered drawing, while FIG. 37(*b*) shows the drawing data represented internally. FIG. 37(*c*) shows the entered sentence data. FIGS. 38(*a*) and(*b*) show the drawing data and text data of the target figure created by the figure creating system from the entered data shown in FIGS. 37(*b*) and(*c*). FIG. 38(*c*) shows the display image of the target figure.

Embodiment 3

Figure 40:
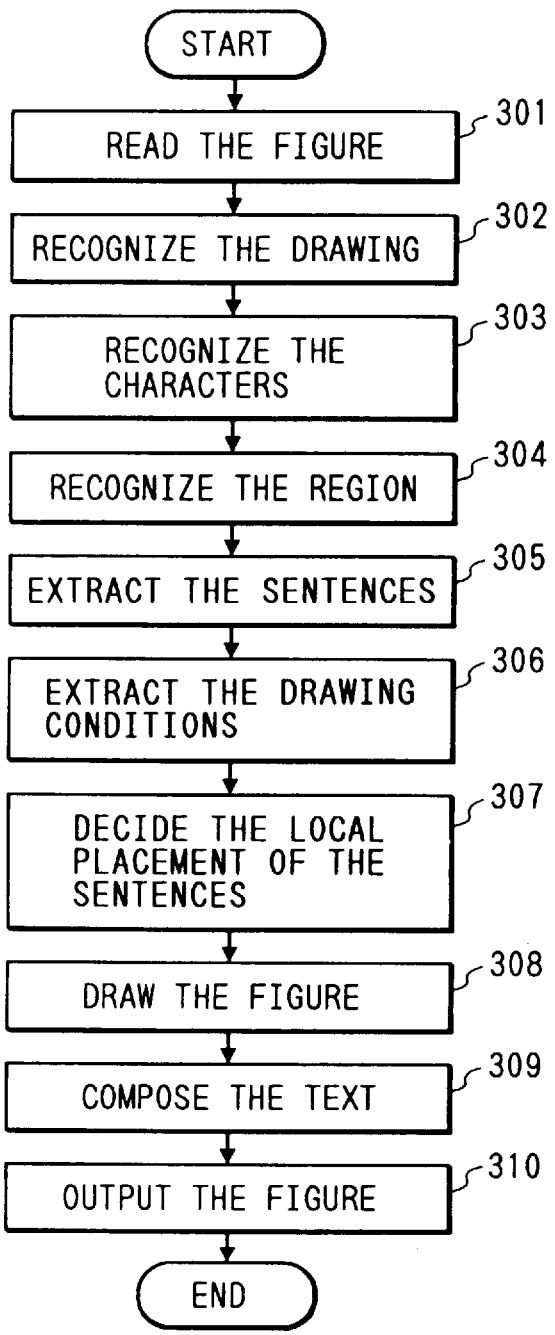
FIG. 40 shows the processing steps of the handwritten figure input system.

The third embodiment is for a handwritten figure input system. The system reads a handwritten figure and converts it into a printed image figure. The handwritten figure input system, as shown in FIG. 39, consists of CPU 1*c*, main storage 2*c*, external storage 3*c*, image scanner 4*c*, and output device 5*c*. The external storage 3*c* is used to store source figure data 31*c* and target figure data 32*c*. The CPU lc executes the processing of each step shown in FIG. 40 to realize the functions of the system. The processing of each step will be explained below.

The figure reading step 301 reads a figure through the image scanner and outputs the binary image data to the main storage 2*c*.

The drawing recognition step 302 analyzes the binary image data on the main storage 2*c* to recognize the drawing. Minor distortion and declination of the line segments caused by handwriting are corrected in this processing. Each line segment is represented with the start point and end point coordinates, and then output to the external storage 3*c* as the drawing data of the source figure data 31*c*.

The character recognition step 303 analyzes the binary image data on the main storage to recognize the characters. The recognized characters are represented by the character codes and output to the main storage 2*c* together with the coordinates of their positions.

The region recognition step 304 is completely the same as the region recognition step 102 of the figure creating system shown in the second embodiment.

The sentence extraction step 305 composes sentence data from the characters and their coordinates recognized in the character recognition step 303 and the region recognized in the region recognition step 304. The region which each character belongs to is identified, and then the characters belonging to each region are collected to compose a sentence data.

The drawing conditions extraction step 306 is completely the same as that 104 of the figure creating system shown in the second embodiment.

The local placement of sentences step 307 determines the lengths in both x and y directions of each sentence display region, and the places the sentence in the display region. The characters are placed according to their coordinates obtained in the character recognition step 303, but the size and pitch of the characters are normalized.

The figure drawing step 308, the text composition step 309, and the figure output step 310 are completely the same as those 107, 108, and 109 of the figure creating system shown in the second embodiment.

{Effects of the Invention}

When translating a figure comprising a drawing and a text, it is necessary to adjust the drawing according to the change of the text length. The figure translation system according to the present invention, however, can adjust the drawing automatically in such a case. The topological and visual characteristics of the source figure are preserved in the target figure. Thus, using this system could reduce greatly the translation cost of documents such as manuals containing many figures.

In the figure creating system, drawing data can be entered regardless of the length of each text to be embedded in the drawing, as well as scaling (enlargement/reduction) of the drawing necessary for embedding the text are executed automatically. In addition, when the text embedded in a drawing is modified, the drawing is also adjusted automatically according to the change of the text length. Such figure creating system will greatly improve the efficiency of creating/modifying a figure comprising a drawing and a text.

In the handwritten figure input system, which recognizes a handwritten figure and converts it to a printed image figure, the size and pitch of handwritten characters may be free. When the display region size for the printed characters varies from that for the handwritten characters, the drawing is adjusted automatically. The handwritten figure input system, therefore, making good use of the characteristics of handwriting, will be very useful for creating figures with texts.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. An automated text extraction and drawing composition method, in a translation system for translating a source drawing including texts in a source language into a target drawing including texts in a target language, said method comprising the steps of:

automatically extracting a source language text from at least one box included in said source drawing;

automatically extracting constraints on lengths, inclinations, relative positions and connections of line segments of said source drawing;

representing the extracted constraints by formulae indicating relations among coordinates of both end points of said line segments;

setting constraints on lengths, inclinations, relative positions and connections of line segments of a target drawing to be the same as those of said source drawing;

translating the extracted source language text into a target language text;

determining coordinates of both end points of line segments of said target drawing under the constraints so that the translated target language text can be contained in a target box corresponding to said at least one box; and embedding said target language text in said target box.

2. An automated text extraction and drawing composition method according to claim 1, further comprising the steps of:

labeling a plurality of boxes in said source drawing;

labeling the extracted source language texts in correspondence with the labeling of said plurality of boxes; and generating said target drawing based upon said constraints of said source drawing and the labels of said plurality of boxes and said extracted source language texts.

3. An automated text extraction and drawing composition method according to claim 1, further comprising the steps of:

calculating the size of each of said at least one target box for embedding the respective target language text therein;

determining the size and position of line segments of each of said at least one target box, based upon said constraints of said target box; and embedding each target language text in respective ones of said at least one target box.

4. An automated text extraction and drawing composition method according to claim 1, wherein said extracting step comprises a step of extracting a plurality of source language texts from a plurality of boxes included in said source drawing, with identification of correspondence of each of a plurality of source language texts to each of said plurality of boxes, respectively.

5. An automated text extraction and drawing composition method, in an information processing system for converting a source drawing including texts in a language into a target drawing including texts in said language, said method comprising the steps of:

automatically extracting a source text from at least one box included in said source drawing;

automatically extracting constraints on lengths, inclinations, relative positions and connections of line segments of said source drawing;

representing the extracted constraints by formulae indicating relations among coordinates of both end points of said line segments;

setting constraints on lengths, inclinations, relative positions and connections of line segments of a target drawing to be the same as those of said source drawing;

determining coordinates of both end points of line segments of said target drawing under the constraints so that a target language text can be contained in a target box corresponding to said at least one box, said target text being a corrected text of said source text; and embedding said target text in said target box.

6. An automated text extraction and drawing composition method according to claim 5, further comprising the steps of:

calculating the size of each of said at least one target box for embedding the respective target text;

determining the size and position of the line segments of each of said at least one target box, based upon said constraints the target box; and embedding each of said target texts in the respective one of said at least one target box.

7. An automated text extraction and drawing composition method according to claim 5, wherein said extracting step comprises a step of extracting a plurality of source texts from a plurality of boxes included in said source drawing, with identification of correspondence of each of said source texts to each of said plurality of boxes respectively.

8. An automated drawing composition method, in an information processing system for converting a source drawing into a target drawing including texts, said method comprising the steps of:

inputting a target text to be embedded in at least one target box included in said target drawing;

automatically extracting constraints on lengths, inclinations, relative positions and connections of line segments of said source drawing;

representing the extracted constraints by formulae indicating relations among coordinates of both end points of said line segments;

setting constraints on lengths, inclinations, relative positions and connections of line segments of a target drawing to be the same as those of said source drawing;

determining coordinates of both end points of line segments of said target drawing under the constraints so that the target text can be contained in a target box corresponding to said at least one target box; and embedding said text into said at least one target box.

9. An automated drawing composition method according to claim 8, further comprising the steps of:

calculating the size of said at least one target box for embedding said text therein;

determining the size and position of the line segments of said at least one target box, based upon said constraints; and embedding said text in said at least one target box.

10. An automated text extraction and drawing composition method, in an information processing system for converting a source drawing including characters into a target drawing including characters, said method comprising the steps of:

reading, as a binary image data, a source drawing including at least one box in which handwritten characters are written;

recognizing said at least one box and said handwritten characters;

automatically extracting the recognized handwritten characters as coded characters to be output as target characters;

automatically extracting constraints on lengths, inclinations, relative positions and connections of line segments of said source drawing;

representing the extracted constraints by formulae indicating relations among coordinates of both end points of said line segments;

setting a constraints on lengths, inclinations, relative positions and connections of line segments of a target drawing to be the same as those of said source drawing;

determining coordinates of both end points of line segments of said target drawing under the constraints so that the target characters can be contained in a target box corresponding to said at least one box; and embedding said target characters in said at least one target box.

11. An automated text extraction and drawing composition system, in a translation system for translating a source drawing including texts in a source language into a target drawing including texts in a target language, comprising:

means for automatically extracting a source language text from at least one box included in said source drawing;

means for automatically extracting constraints on lengths, inclinations, relative positions and connections of line segments of said source drawing;

means for representing the extracted constraints by formulae indicating relations among coordinates of both end points of said line segments;

means for setting constraints on lengths, inclinations, relative positions and connections of line segments of a target drawing to be the same as those of said source drawing;

means for translating the extracted source language text into a target language text;

means for determining coordinates of both end points of line segments of said target drawing under the constraints so that the translated target language text can be contained in a target box corresponding to said at least one box; and means for embedding said target language text in said at least one target box.

12. An automated text extraction and drawing composition system according to claim 11, further comprising:

means for labeling a plurality of boxes in said source drawing;

means for labeling the extracted source language texts in correspondence with the labeling of said plurality of boxes; and means for generating said target drawing based upon said constraints of said source drawing and the labels of said plurality of boxes and said extracted source language texts.

13. An automated text extraction and drawing composition system according to claim 11, further comprising:

means for calculating the size of said at least one target box for embedding the respective target language text;

means for determining the size and position of the line segments of said at least one target box, based upon said constraints the target drawing; and means for embedding each target language text in the respective ones of said at least one target box.

14. An automated text extraction and drawing composition system according to claim 11, wherein said extracting means comprises means for extracting a plurality of source language texts from a plurality of boxes included in said source drawing, with identification of correspondence of each of said source language texts to each of said boxes respectively.

15. An automated text extraction and drawing composition system, in an information processing system for converting a source drawing including texts in a language into a target drawing including texts in said language, comprising:

means for automatically extracting a source text from at least one box included in said source drawing;

means for automatically extracting constraints on lengths, inclinations, relative positions and connections of line segments of said source drawing;

means for representing the extracted constraints by formulae indicating relations among coordinates of both end points of said line segments;

means for setting constraints on lengths, inclinations, relative positions and connections of a target drawing to be the same as those of said source drawing;

means for determining coordinates of both end points of line segments of said target drawing under the constraints so that a target text can be contained in a target box corresponding to said at least one box, said target text being a corrected text of said source text; and means for embedding said target text in said target box.

16. An automated text extraction and drawing composition system according to claim 15, wherein said extracting means comprises means for extracting a plurality of source texts from a plurality of boxes included in said source drawing, with identification of correspondence of each of said source texts to each of said boxes respectively.

17. An automated drawing composition system, in an information processing system for converting a source drawing into a target drawing including texts, comprising:

means for inputting a target text to be embedded in at least one target box included in said target drawing;

means for automatically extracting constraints on lengths, inclinations, relative positions and connections of line segments of said source drawing;

means for representing the extracted constraints by formulae indicating relations among coordinates of both end points of said line segments;

means for setting constraints on lengths, inclinations, relative positions and connections of a target drawing to be the same as those of said source drawing;

means for determining coordinates of both end points of line segments of said target drawing under the constraints so that the target text can be contained in a target box corresponding to said at least one box; and means for embedding said text into said at least one target box.

18. An automated drawing composition system according to claim 17, further comprising:

means for calculating the size of said at least one target box for embedding said text;

means for determining the size and position of the line segments of said at least one target box, based upon said constraints of said target box; and means for embedding said text in said at least one target box.

19. An automated text extraction and drawing composition system, in an information processing system for converting a source drawing including characters into a target drawing including characters, comprising:

- means for reading, as a binary image data, a source drawing including at least one target box in which handwritten characters are written;
- means for recognizing said at least one box and said handwritten characters;
- means for automatically extracting the recognized handwritten characters as coded characters to be output as target characters;
- means for automatically extracting constraints on lengths, inclinations, relative positions and connections of line segments of said source drawing;
- means for representing the extracted constraints by formulae indicating relations among coordinates of both end points of said line segments;
- means for setting constraints on lengths, inclinations, relative positions and connections of line segments of a target drawing to be the same as those of said source drawing;
- means for determining coordinates of both end points of line segments of said target drawing under the constraints so that the target characters can be contained in a target box corresponding to said at least one box; and
- means for embedding said target characters in said target box.

* * * * *